United States Patent [19]

Kitchen

[11] Patent Number: 4,584,346
[45] Date of Patent: Apr. 22, 1986

[54] CRAZE-RESISTANT TRANSPARENT RESINOUS POLYMODAL BLOCK COPOLYMERS

[75] Inventor: Alonzo G. Kitchen, Bartlesville, Okla.

[73] Assignee: Phillips Petroleum Company, Bartlesville, Okla.

[21] Appl. No.: 584,569

[22] Filed: Feb. 29, 1984

[51] Int. Cl.[4] .............................................. C08L 53/02
[52] U.S. Cl. ........................................ 525/98; 525/250; 525/271; 525/314
[58] Field of Search .................. 525/250, 271, 314, 98

[56] References Cited

U.S. PATENT DOCUMENTS

| | | | |
|---|---|---|---|
| T953,011 | 12/1976 | Smith | 525/314 |
| T967,004 | 2/1978 | Smith | 526/173 |
| 3,639,517 | 2/1972 | Kitchen et al. | 525/92 |
| 3,937,760 | 2/1976 | Cole et al. | 525/271 |
| 4,054,616 | 10/1977 | Miki et al. | 525/272 |
| 4,080,407 | 3/1978 | Fodor | 525/314 |
| 4,086,298 | 4/1978 | Fahrbach et al. | 525/122 |
| 4,087,484 | 5/1978 | Miki et al. | 528/492 |
| 4,089,913 | 5/1978 | Miki et al. | 525/314 |
| 4,091,053 | 5/1978 | Kitchen | 525/98 |
| 4,122,134 | 10/1978 | Miki et al. | 525/272 |
| 4,153,647 | 5/1979 | Glukhovskoi et al. | 525/250 |
| 4,167,545 | 9/1979 | Fahrbach et al. | 525/122 |
| 4,180,530 | 12/1979 | Bi et al. | 525/98 |
| 4,208,356 | 6/1980 | Fukawa et al. | 525/89 |
| 4,221,884 | 9/1980 | Bi et al. | 525/314 |
| 4,248,980 | 2/1981 | Bi et al. | 525/271 |
| 4,248,981 | 2/1981 | Milkovich et al. | 525/271 |
| 4,248,982 | 2/1981 | Bi et al. | 525/271 |
| 4,248,983 | 2/1981 | Bi et al. | 525/314 |
| 4,248,984 | 2/1981 | Bi et al. | 525/314 |
| 4,267,284 | 5/1981 | Kitchen | 525/99 |
| 4,291,139 | 9/1981 | Halasa et al. | 525/314 |
| 4,335,221 | 6/1982 | Gerberding | 525/89 |
| 4,346,198 | 8/1982 | Doak et al. | 525/314 |
| 4,403,074 | 9/1983 | Moczygemba | 525/386 |
| 4,405,754 | 9/1983 | Moczygemba et al. | 525/102 |
| 4,418,180 | 11/1983 | Heinz et al. | 525/314 |

*Primary Examiner*—Wilbert J. Briggs, Sr.
*Attorney, Agent, or Firm*—E. T. Kittleman

[57] ABSTRACT

Resinous polymodal block copolymers of such as butadiene and styrene which are craze-resistant, transparent, and substantially color-free, and methods of producing the block copolymers. The copolymers are prepared by sequential charge copolymerization modes comprising the solution polymerization of at least two charges each of a conjugated diene, a monovinylarene, and a monoalkali metal initiator, at least one charge of conjugated diene monomer precedes the last charge of monoalkali metal initiator, at least one charge each of monovinylarene and of conjugated diene follows the last charge of monoalkali metal initiator, and the final charge of monomer is a charge of conjugated diene monomer, such that the number of charges of each of said components is not more than three, and the total of the charges of the three components is 8 or 9.

63 Claims, No Drawings

CRAZE-RESISTANT TRANSPARENT RESINOUS POLYMODAL BLOCK COPOLYMERS

FIELD OF THE INVENTION

The invention pertains to resinous copolymers. In one aspect, the invention pertains to resinous copolymers which are craze-resistant and transparent with minimal coloration. In a further aspect, the invention pertains to methods of sequential block copolymerization for the preparation of craze-resistant, low-color resinous copolymers. In another aspect, the invention pertains to methods of producing block copolymer resins which are transparent, possess good mechanical properties, particularly impact resistance, are not susceptible to flexural stress clouding, and yet are transparent with minimal coloration.

BACKGROUND OF THE INVENTION

Resinous block copolymers have been produced by methods employing various sequential polymerization steps. Among the pioneer inventions in the field of resinous block copolymers are such patents as U.S. Pat. No. 3,639,517 to Kitchen and Szalla, U.S. Pat. No. 4,080,407 to Fodor, and U.S. Pat. No. 4,091,053 to Kitchen.

Much effort has been directed to the preparation of substantially transparent block copolymer resins with a variety of block structures produced by a variety of monomer addition sequences.

However, products frequently have had residual coloration tinges, or the impact strength has been low, or importantly for many purposes there has been a high incidence of crazing (flexural stress clouding).

One of the more important applications for transparent resinous copolymers has been in blister packaging of bandages, syringes, and the like for contained product protection and maintenance of sterile conditions during shipping. Unfortunately, all too frequently, crazing of the blister packs has occurred because of squeezing during shipping. The crazed packs, plus their valuable contents, then must be discarded by the recipients, such as hospitals or physicians, since it is presumed that air has leaked into the pack and that the contents have lost their sterility due to contamination.

Other usages of the transparent resinous polymers have been for blending with general purpose polystyrene. The transparent resinous polymers have been used for various molding purposes. However, many of the so-formed products have had a bluish tinge, or lacked clarity because of haze, frequently leading to customer objection and reluctance to purchase.

Needed, still, are resinous copolymers, readily made, impact resistant, exhibiting a high resistance to crazing, transparent with good clarity, substantially no color, and substantially haze-free.

BRIEF SUMMARY OF THE INVENTION

I have discovered resinous block copolymers which are highly craze-resistant, transparent, and substantially color-free. I have also discovered methods of producing these highly desirable craze-resistant non-blue, non-hazy, transparent block copolymers.

A haze of less than 3 is considered good, and of about 2 or less very good, per ASTM 1003 on a 50 mil thick sample (see my Table VI herein). Substantial freedom from craze is desired (see my Table VI herein).

It is an object of my invention to provide resinous block copolymers which in use are substantially craze-resistant and exhibit minimal coloration, retaining a haze-free character, particularly in thin sheet products. It is another object of my invention to provide methods for producing these highly desirable resinous copolymers.

The polymers are characterized as resinous, polymodal, copolymers of at least one conjugated diene with at least one monovinylarene, and are prepared so that at least a portion of the final product is of a coupled character, linear or radial or both. The copolymers contain about 55 to 95, preferably 60 to 87, more preferably 70 to 80, percent by weight of copolymerized monovinyl aromatic compound (monovinylarene), and correspondingly about 45 to 5, 40 to 13, or 30 to 27, percent by weight of copolymerized conjugated diene. The coupled portions of the resinous, polymodal copolymers have terminal polymonovinylarene blocks on the extending arms of each linear or radial copolymer molecule, and further contain a central internal block of polyconjugated diene, ignoring any interruption of the internal block by a coupling agent residue. The resinous copolymeric polymodal products also contain portions of linear uncoupled block copolymers of poly(monovinylarene)-poly(conjugated diene), which content is considered to be an important portion of the resinous product, important that is in its overall properties.

The copolymers are prepared by a process of sequential charge copolymerization comprising the solution polymerization of at least two charges each of a conjugated diene monomer, a monovinylarene monomer, and a monoalkali metal initiator, at least one charge of conjugated diene monomer precedes the last charge of alkali metal initiator, at least one charge each of monovinylarene and of conjugated diene follow the last charge of monoalkali metal initiator, and the last charge of monomer is a charge of conjugated diene, such that the number of charges of each of the three components is not more than three, and the total of the charges of the three components is 8 or 9. Each monomer charge is allowed to polymerize to substantial completion prior to the next monomer charge (if any).

The resinous, polymodal block copolymers can be prepared by various modifications (modes) of the above general procedure. Table I following shows the preferred sequences, compared with prior art sequences and control modes. In Table I, the indicated Runs refer to exemplary Runs in my Examples included herein in my specification. The differences in result are significant, my inventive products being more craze-resistant and having less coloration than the comparative products.

TABLE I

| Charge Order | Invention | | | Comparisons | | |
|---|---|---|---|---|---|---|
| | Mode A Runs 1-2-3 | Mode B Runs 4-5-6 | Mode C Runs 7-8 | Runs 9-10-11-12-13-14 | Runs 15-16-17 | Example VII |
| 1/2 | L/S* | L/S* | L/S* | L/S* | L/S* | L/S* |
| 3 | B | B | — | — | — | — |

TABLE I-continued

| Charge Order | Invention | | | Comparisons | | |
|---|---|---|---|---|---|---|
| | Mode A Runs 1-2-3 | Mode B Runs 4-5-6 | Mode C Runs 7-8 | Runs 9-10-11-12-13-14 | Runs 15-16-17 | Example VII |
| 4/5 | L/S* | S | L/S* | S | S | S |
| 6 | B | B | B | — | B | — |
| 7/8 | L/S* | L/S* | L/S* | L/S* | L/S* | S |
| 9 | B | B | B | B | B | B |
| (Total additions) | (9) | (8) | (8) | (6) | (7) | (5) |
| 10 | C | C | C | C | C | C |

*either L or S are charged first, then the other, or effectively substantially at the same time; presently preferred is charge of initiator prior to monomer.
where L = monoalkali metal initiator.
S = monovinylarene monomer and the resultant polymer block.
B = conjugated diene monomer and the resultant polymer block.
C = coupling agent.

In Table I, "L" refers to any monoalkali metal initiator useful in solution polymerization systems; "S" refers to a monovinylarene monomer and to the resultant polymonovinylarene block formed by the substantially complete polymerization of the monovinylarene monomer added at the indicated stage; "B" indicates a conjugated diene monomer and the resultant polyconjugated diene block formed from the substantially complete polymerization of the conjugated diene monomer added at that stage; and "C" indicates a coupling agent.

Table II following indicates further the relationship of my inventive sequences compared to the other methods as to the number of additions of alkali metal initiator, conjugated diene, and monovinylarene prior to coupling:

TABLE II

| | Number of Additions of Each Component | | | | | |
|---|---|---|---|---|---|---|
| | Invention | | | Comparisons | | |
| | Mode A Runs 1-2-3 | Mode B Runs 4-5-6 | Mode C Runs 7-8 | Runs 9-10-11 12-13-14-19 | Runs 15-16-17-18 | Example VII |
| L | 3 | 2 | 3 | 2 | 2 | 1 |
| S | 3 | 3 | 3 | 3 | 3 | 3 |
| B | 3 | 3 | 2 | 1 | 2 | 1 |
| Total Additions | 9 | 8 | 8 | 6 | 7 | 5 |

As can be seen from Table II above, comparisons employ three additions of monovinylarene (such as styrene), only a single or two additions of conjugated diene monomer (such as butadiene), and, only one or two additions of monoalkali metal initiator. Thus, my products and processes are distinguished therefrom, and are improved thereover, by using at least two additions of conjugated diene monomer as well as at least two, and preferably three, additions of monoalkali metal initiator, in a prescribed sequence as disclosed hereinabove, and as exemplified by my Examples hereinafter set forth.

In accordance with one aspect (mode) of my invention, the following copolymeric species are considered to be formed prior to coupling in accordance with the sequence of addition of monomers and initiator:

Mode A $S_1$-$B_1$-$S_2$-$B_2$-$S_3$-$B_3$-L
$S_2$-$B_2$-$S_3$-$B_3$-L
$S_3$-$B_3$-L.

Each of "$S_1$", "$S_2$", and "$S_3$" indicates a block of substantially homopolymeric polymonovinylarene, formed in appropriate sequence by addition of the monovinylarene monomer and polymerization thereof under solution polymerization conditions such that substantially complete polymerization of the monomer charge is obtained before the next step of monomer or initiator addition, if any. Each of "$B_1$", "$B_2$", and "$B_3$" similarly represents a block of substantially homopolymeric poly(conjugated diene) similarly formed in appropriate sequence by polymerization of the charge to substantial completion prior to the next step or charge. The subscript numbers indicate which step evolved the block or blocks. Each "L" indicates a residue from a monoalkali metal initiator remaining on the end of the polymerization chain prior to termination. The "L" subsequently is removed or displaced during coupling and/or termination when the above species groups form various combinations of coupled copolymeric species. My methods thus effectively provide broad polymodal benefits.

In another aspect (mode) of my invention, the following copolymeric species are considered to be formed prior to coupling:

Mode B $S_1$-$B_1$-$S_2$-$B_2$-$S_3$-$B_3$-L
$S_3$-$B_3$-L.

In the third aspect of my invention, presently more preferred than Modes A and B, the following species are expected to be formed prior to coupling:

Mode C $S_1$-$S_2$-$B_1$-$S_3$-$B_2$-L
$S_2$-$B_1$-$S_3$-$B_2$-L
$S_3$-$B_2$-L.

The final resinous polymodal product resulting from the polymerization procedure of the prescribed series of steps of additions of monomer/initiator/coupling also result in proportions of terminated uncoupled species which escape coupling.

Of course, in addition to the sequence of addition of the monomers and of the initiator, it is important to control the amount of each monomer and initiator addition under each sequence above at each increment so that a suitable proportion of block sizes and proportion of polymodality is obtained in each mode. It is feasible to stretch out over an interval of time the addition of one or more of the increments of initiator and/or the input of the appropriate monovinylarene monomer charge, thus spreading (increasing) further the polymodality of the resulting product upon coupling.

Tables III following describe broad and preferred increments of monomers and of monoalkali metal initiator, using L to symbolize the monoalkali metal indicator, S for monovinylarene, and B for conjugated diene.

TABLES III

Ranges of Monomers and of Initiator Additions at each Increment

|  |  | Broad | Preferred |
|---|---|---|---|
| Mode A | | | |
| Step IA | L-1 (phm)[1][2] | 0.02–0.035 | 0.022–0.03 |
|  | L-1 (mhm)[3][4] | 0.3–0.55 | 0.34–0.47 |
|  | S-1 (phm) | 30–45 | 35–41 |
| Step IB | B-1 (phm) | 0.6–9 | 2–4 |
| Step IIA | L-2 (phm) | 0.02–0.035 | 0.022–0.03 |
|  | L-2 (mhm) | 0.3–0.55 | 0.34–0.47 |
|  | S-2 (phm) | 10–20 | 12–18 |
| Step IIB | B-2 (phm) | 0.6–9 | 2–4 |
| Step III | L-3 (phm) | 0.07–0.18 | 0.1–0.15 |
|  | L-3 (mhm) | 1.1–2.8 | 1.56–2.34 |
|  | S-3 (phm) | 15–30 | 18–26 |
| Step IV | B-3 (phm) | 3.8–27 | 16–23 |
| Totals | S (phm) | 55–95 | 70–80 |
|  | B (phm) | 45–5 | 30–20 |
|  | L (phm) | 0.1–0.25 | 0.13–0.2 |
|  | L (mhm) | 1.7–3.9 | 2.2–3.3 |
| Mode B | | | |
| Step IA | L-1 (phm) | 0.025–0.05 | 0.03–0.04 |
|  | L-1 (mhm) | 0.39–0.78 | 0.47–0.63 |
|  | S-1 (phm) | 30–45 | 35–40 |
| Step IB | B-1 (phm) | 0.6–9 | 2–4 |
| Step IIA | S-2 (phm) | 10–20 | 13–18 |
| Step IIB | B-2 (phm) | 0.6–9 | 2–4 |
| Step III | L-2 (phm) | 0.1–0.25 | 0.12–0.17 |
|  | L-2 (mhm) | 1.56–3.9 | 1.88–2.66 |
|  | S-3 (phm) | 15–30 | 18–25 |
| Step IV | B-3 (phm) | 3.8–27 | 15–23 |
| Totals | S (phm) | 55–95 | 70–80 |
|  | B (phm) | 45–5 | 30–20 |
|  | L (phm) | 0.13–0.25 | 0.15–0.22 |
|  | L (mhm) | 2.–4.7 | 2.3–3.4 |
| MODE C | | | |
| Step IA | L-1 (phm) | 0.02–0.04 | 0.024–0.035 |
|  | L-1 (mhm) | 0.3–0.63 | 0.38–0.55 |
|  | S-1 (phm) | 30–45 | 35–40 |
| Step IIA | L-2 (phm) | 0.02–0.04 | 0.025–0.035 |
|  | L-2 (mhm) | 0.3–0.63 | 0.38–0.55 |
|  | S-2 (phm) | 10–20 | 12–18 |
| Step IIB | B-1 (phm) | 1.2–18 | 4–8 |
| Step III | L-3 (phm) | 0.06–0.18 | 0.08–0.014 |
|  | L-3 (mhm) | 0.94–2.8 | 1.25–2.19 |
|  | S-3 (phm) | 15–30 | 20–25 |
| Step IV | B-2 (phm) | 3.8–27 | 15–22 |
| Totals | S (phm) | 55–95 | 70–80 |
|  | B (phm) | 45–5 | 30–20 |
|  | L (phm) | 0.1–0.26 | 0.13–0.2 |
|  | L (mhm) | 1.5–4 | 2–3.3 |

[1]phm = parts by weight per 100 parts by weight of total monomers.
[2]phm for L is based only on n-butyllithium molecular weight.
[3]mhm = gram-millimoles per 100 grams of total monomers.
[4]mhm for L is applicable for any monoalkali metal initiator. The levels suggested are exclusive of requirements for any poisons in the solvent streams, such as traces of alcohols.

Based on the above monomer additions, assuming substantially complete (co)polymerization of each monomer increment added at each step before proceeding to the next step, and assuming equivalent rates of initiation and propagation, the following relative Block Sizes Prior to Coupling can be calculated (in which phm≡weight percent) as shown below in Tables IV:

TABLES IV

Calculated Relative Block Sizes Before Coupling
Calculated from Ranges of Monomer Additions

|  | Broad | Preferred |
|---|---|---|
| Mode A | | |
| (1) $S_1$—$B_1$—$S_2$—$B_2$—$S_3$—$B_3$: | | |
| $S_1$ (phm) | 30–45 | 35–41 |
| $B_1$ (phm) | 0.6–9 | 2–4 |
| $S_2$ (phm) | 5–10 | 6–9 |
| $B_2$ (phm) | 0.3–4.5 | 1–2 |
| $S_3$ (phm) | 2.6–4.2 | 2.7–3.7 |
| $B_3$ (phm) | 0.7–3.8 | 2.4–3.3 |
| (2) $S_2$—$B_2$—$S_3$—$B_3$: | | |
| $S_2$ (phm) | 5–10 | 6–9 |
| $B_2$ (phm) | 0.3–4.5 | 1–2 |
| $S_3$ (phm) | 2.6–4.2 | 2.7–3.7 |
| $B_3$ (phm) | 0.7–3.8 | 2.4–3.3 |
| (3) $S_3$—$B_3$: | | |
| $S_3$ (phm) | 9.7–21.6 | 12.5–18.5 |
| $B_3$ (phm) | 2.4–19.4 | 11.1–16.4 |
| After Coupling: | | |
| $M_w \times 10^{-3(1)}$ | 80–300 | 150–200 |
| $M_n \times 10^{-3(1)}$ | 50–200 | 90–120 |
| Mode B | | |
| (1) $S_1$—$B_1$—$S_2$—$B_2$—$S_3$—$B_3$: | | |
| $S_1$ (phm) | 30–45 | 35–40 |
| $B_1$ (phm) | 0.6–9 | 2–4 |
| $S_2$ (phm) | 10–20 | 13–18 |
| $B_2$ (phm) | 0.6–9 | 2–4 |
| $S_3$ (phm) | 3–5 | 3.6–4.8 |
| $B_3$ (phm) | 0.8–4.5 | 3–4.4 |
| (2) $S_3$—$B_3$: | | |
| $S_3$ (phm) | 12–25 | 14.4–20.2 |
| $B_3$ (phm) | 3–22.5 | 12–18.6 |
| After Coupling | | |
| $M_w \times 10^{-3}$ | 80–300 | 140–200 |
| $M_n \times 10^{-3}$ | 50–200 | 90–120 |
| Mode C | | |
| (1) $S_1$—$S_2$—$B_1$—$S_3$—$B_2$: | | |
| $S_1$ (phm) | 30–45 | 35–40 |
| $S_2$ (phm) | 5–10 | 6–9 |
| $B_1$ (phm) | 0.6–9 | 2–4 |
| $S_3$ (phm) | 3–4.6 | 3.8–4.2 |
| $B_2$ (phm) | 0.7–4.2 | 2.8–3.7 |
| (2) $S_2$—$B_1$—$S_3$—$B_2$: | | |
| $S_2$ (phm) | 5–10 | 6–9 |
| $B_1$ (phm) | 0.6–9 | 2–4 |
| $S_3$ (phm) | 3–4.6 | 3.8–4.2 |
| $B_2$ (phm) | 0.7–4.2 | 2.8–3.7 |
| (3) $S_3$—$B_2$: | | |
| $S_3$ (phm) | 9–20.7 | 12.4–16.6 |
| $B_2$ (phm) | 2.4–18.6 | 9.3–14.6 |
| After Coupling: | | |
| $M_w \times 10^{-3}$ | 80–300 | 150–200 |
| $M_n \times 10^{-3}$ | 50–200 | 90–120 |

[1]$M_w$ = weight average molecular weight.
[2]$M_n$ = number average molecular weight.

Monomers

The conjugated dienes employed ordinarily are those of 4 to 6 carbon atoms per molecule, including the presently preferred 1,3-butadiene, as well as isoprene, 2-ethyl-1,3-butadiene, 2,3-dimethyl-1,3-butadiene, and piperylene, alone or in admixture.

The monovinylarenes employed alone or in admixture, ordinarily contain 8 to 10 carbon atoms per molecule, including the presently preferred styrene, as well as α-methylstyrene, p-vinyltoluene, m-vinyltoluene, o-vinyltoluene, 4-ethylstyrene, 3-ethylstyrene, 2-ethylstyrene, 4-tert-butylstyrene, and 2,4-dimethylstyrene.

Polymerization

The solution process polymerization is carried out as is known in the art in a hydrocarbon diluent at any suitable temperature such as in the range of about −100° to 150° C., more usually about 0° to 110° C., at a pressure sufficient to maintain the reaction mixture substantially as a liquid. Preferred are cycloparaffins, alone or in admixture with such as pentane or isooctane. Presently preferred is cyclohexane. As is known, small amounts of polar compounds, such as tetrahydrofuran, can be included in the diluent for vinyl control of the diene polymer blocks, and/or to improve effectiveness of some initiators such as the primary alkyllithium initiators for monovinylarene polymerizations.

The initiators can be any of the organomonoalkali metal compounds known for such purposes. Preferably employed are the hydrocarbylmonoalkali metal compounds which correspond to the formula RM in which R is a hydrocarbyl aliphatic, cycloaliphatic, or aromatic radical, preferably alkyl, and M is an alkali metal, preferably lithium. Presently preferred are alkylmonolithium initiators such as sec- and n-butyllithium. The amounts of monoalkali metal-based initiator employed depends upon the desired polymer or incremental block molecular weight as is known in the art, and are readily determinable from my ranges given above, making due allowance for traces of poisons in the feed streams.

The polymerization is conducted in the substantial absence of air or moisture, preferably under an inert atmosphere. The resulting polymers contain a very high percentage of molecules in which an alkali metal atom is positioned at an end of the polymer chains. Of course, traces of impurities present in the feeds, such as water or alcohol, tend to reduce the amount of monoalkali metal-terminated polymer formed. Thereafter, a coupling step is performed.

Coupling Reaction

In my use of the term "coupling" as herein employed, the term means the bringing together and joining, by means of one or more central coupling atoms or coupling moieties, two or more of the living monoalkali metal-terminated polymer chains. A wide variety of compounds for such purposes can be employed.

Among the suitable coupling agents are the di- or multivinylaromatic compounds, di- or multiepoxides, di- or multiisocyanates, di- or multiimines, di- or multialdehydes, di- or multiketones, di- or multihalides, particularly silicon halides and halosilanes mono-, di-, or multianhydrides, mono-, di-, or multiesters, preferably the esters of monoalcohols with polycarboxylic acids, diesters which are esters of monohydric alcohols with dicarboxylic acids, lactones, and the like, including combination type compounds containing two or more groups, and mixtures.

Examples of suitable vinylaromatic coupling agents include divinylbenzene, 1,2,4-trivinylbenzene, 1,3-divinylnaphthalene, 1,3,5-trivinylnaphthalene, 2,4-divinylbiphenyl, and the like. Of these, the divinylaromatic hydrocarbons are preferred, particularly divinylbenzene in either its ortho, meta, or para isomer. Commercial divinylbenzene which is a mixture of the three isomers and other compounds is satisfactory.

While any di- or multiepoxide can be used, those which are liquid are convenient since they are more readily handled and form a relatively small nucleus for a radial polymer. Epoxidized hydrocarbon polymers such as epoxidized liquid polybutadiene and the epoxidized vegetable oils such as epoxidized soybean oil and epoxidized linseed oil, and epoxy compounds such as 1,2; 5,6; 9,10-triepoxydecane, and the like, can be used.

Examples of suitable multiisocyanates include benzene-1,2,4-triisocyanate, naphthalene-1,2,5,7-tetraisocyanate, and the like. Commercially available products known as PAPI-1, a polyarylpolyisocyanate having an average of 3 isocyanate groups per molecule and an average molecular weight of about 380 are suitable.

The multiimines, also known as multiaziridinyl compounds, such as those containing 3 or more aziridine rings per molecule, are useful. Examples include the triaziridinyl phosphine oxides or sulfides such as tri(1-aziridinyl)phosphine oxide, tri(2-methyl-1-aziridinyl)phosphine oxide, tri(2-ethyl-3-decyl-1-aziridinyl)phosphine sulfide, and the like.

The multialdehydes are represented by compounds such as 1,4,7-naphthalenetricarboxyaldehyde, 1,7,9-anthracenetricarboxyaldehyde, 1,1,5-pentanetricarboxyaldehyde, and similar multialdehyde-containing aliphatic and aromatic compounds. The multiketones are represented by compounds such as 1,4,9,10-anthracenetetrone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-tricarbethoxybenzene, and the like.

Among the multihalides are the silicon tetrahalides such as silicon tetrachloride, silicon tetrabromide, and silicon tetraiodide; the trihalosilanes such as trifluorosilane, trichlorosilane, trichloroethylsilane, tribromobenzylsilane, and the like; and the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2; 4,5-diepoxy-3-hexanone, 1,2; 11,12-diepoxy-8-pentadecanone, 1,3; 18,19-diepoxy-7,14-eicosanedione, and the like.

Other metal multihalides, particularly those of tin, lead, or germanium, can be employed as coupling and branching agents. Silicon or other metal multialkoxides, such as silicon tetraethoxide, are also suitable coupling agents.

Any effective amount of the coupling agent can be employed. While the amount is not believed to be particularly critical, a stoichiometric amount relative to the active polymer-alkali metal tends to promote maximum coupling as a generality. However, less than stoichiometric amounts can be used for lesser degrees of coupling where desired for particular products of broadened molecular weight.

Typically, the total amount of coupling agent is in the range of about 0.1 to 20 mhm (gram millimoles per 100 grams of total monomers employed in the polymerization), presently preferably about 0.1 to 1 mhm (or about 0.1 to 1 phm). Preferred at present is an epoxidized soybean oil.

Polymer Recovery

Following completion of the coupling reaction, the coupled polymer, which may still contain bound alkali metal atoms depending on the type of coupling agent employed, is treated to remove any remaining alkali metal from the copolymer and to recover the copolymer.

The polymer cement (polymer in polymerization solvent) from polymerization usually contains about 10 to 40, more usually 20 to 30, weight percent solids, the balance solvent. Preferably, but not necessarily, the polymer cement is flashed to remove by evaporation a portion of the solvent so as to reduce the solvent content to a concentration of about 10 to 50, more usually about 30 to 40, weight percent (corresponding to a solids content of about 90 to 50, more usually about 70 to 60, weight percent).

The polymer cement from polymerization, optionally concentrated by flashing, then is treated by various means, as is known in the art, such as by carbon dioxide and water, or treated with an aliphatic linear $\alpha,\omega$-dibasic acid, such as disclosed in U.S. Pat. No. 4,403,074, and recovered such as by separation and drying.

The resinous copolymeric products can be, and normally are, compounded with anti-oxidants, anti-blocking agents, release agents, and the like, as known in the compounding arts.

The resinous polymodal in situ made copolymer products can be blended with general purpose polystyrene. Broad ranges include such as about 5-90 weight percent polystyrene, more usually 10-40 weight percent polystyrene, the balance one or more of my polymodal resinous impact resistant copolymer products.

EXAMPLES

Examples following are intended to further illustrate my invention. Particular species employed, relationships, ratios, conditions, should be considered as a part of my overall disclosure without being limiting of the reasonable scope of my invention.

EXAMPLE I

These data describe the preparation of inventive coupled, resinous, polymodal butadiene-styrene copolymers employing three n-butyllithium (NBL) initiator charges, three styrene charges, and three 1,3-butadiene charges, total 9, prior to coupling. Butadiene, styrene, and NBL were employed as representative of the conjugated dienes, monovinylarenes, and monoalkali metal initiators, respectively.

Polymerization runs were carried out under nitrogen in a stirred, jacketed, stainless steel reactor of two gallons capacity employing essentially anhydrous reactants and conditions. Recipes 1, 2, and 3 were used for the preparation of ten representative, inventive, resinous copolymer samples:

| | Recipe 1 | | | |
|---|---|---|---|---|
| | Run 1A | Run 1B | Run 1C | Run 1D |
| Step IA | | | | |
| Cyclohexane diluent, phm[1] | 150 | 150 | 150 | 150 |
| Tetrahydrofuran, phm | 0.025 | 0.025 | 0.025 | 0.025 |
| Styrene, phm | 37 | 37 | 37 | 37 |
| n-Butyllithium, phm | 0.025 | 0.025 | 0.025 | 0.025 |
| Polymerization Time, min. | 12 | 12 | 13 | 12 |
| Polymerization Temp.[2], °F. | 139→167 | 126→156 | 148→167 | 140→154 |
| Reactor Pressure, psig | 21→30 | 25→30 | 26→30 | 25→30 |
| Step IB | | | | |
| Cyclohexane[3], phm | 6.7 | 6.7 | 6.7 | 6.7 |
| 1,3-Butadiene, phm | 3 | 3 | 3 | 3 |
| Polymerization Time, min. | 15 | 15 | 21 | 17 |
| Polymerization Temp., °F. | 161 | 151 | 160 | 159 |
| Reactor Pressure, psig | 30 | 30 | 30 | 30 |
| Step IIA | | | | |
| Cyclohexane, phm | 13.3 | 13.3 | 13.3 | 13.3 |
| n-Butyllithium, phm | 0.025 | 0.025 | 0.025 | 0.025 |
| Styrene, phm | 16 | 16 | 16 | 16 |
| Polymerization Time, min. | 10 | 10 | 9 | 10 |
| Polymerization Temp., °F. | 148→165 | 150→163 | 155→161 | 156→151 |
| Reactor Pressure, psig | 30→35 | 31→35 | 30→31 | 30→35 |
| Step IIB | | | | |
| Cyclohexane, phm | 6.7 | 6.7 | 6.7 | 6.7 |
| 1,3-Butadiene, phm | 3 | 3 | 3 | 3 |
| Polymerization Time, min. | 15 | 16 | 22 | 18 |
| Polymerization Temp., °F. | 165 | 163 | 161 | 165 |
| Reactor Pressure, psig | 35 | 35 | 31 | 35 |
| Step III | | | | |
| Cyclohexane, phm | 13.3 | 13.3 | 13.3 | 13.3 |
| n-Butyllithium, phm | 0.11 | 0.11 | 0.11 | 0.11 |
| Styrene, phm | 23 | 23 | 23 | 23 |
| Polymerization Time, min. | 10 | 11 | 16 | 10 |
| Polymerization Temp., °F. | 150→174 | 144→165 | 144→161 | 145→179 |
| Reactor Pressure, psig | 30→50 | 30→50 | 30→50 | 20→50 |
| Step IV | | | | |
| Cyclohexane, phm | 6.7 | 6.7 | 6.7 | 6.7 |
| 1,3-Butadiene, phm | 18 | 18 | 18 | 18 |
| Polymerization Time, min. | 20 | 14 | 19 | 20 |
| Polymerization Temp., °F. | 174→218 | 164→216 | 161→215 | 179→218 |
| Reactor pressure, psig | 50 | 50 | 50 | 50 |
| Step V (Coupling) | | | | |
| Cyclohexane, phm | 6.7 | 6.7 | 6.7 | 6.7 |
| Admex 711[4], phm | 0.4 | 0.4 | 0.4 | 0.4 |
| Coupling Time, min. | 20 | 20 | 20 | 20 |
| Coupling Temp., °F. | 218 | 216 | 215 | 218 |
| Reactor Pressure, psig | 50 | 50 | 50 | 50 |
| Step VI (Recovery) | | | | |
| Water, phm | 0.22 | 0.22 | 0.22 | 0.22 |
| $CO_2$, psi[5] | 120 | 120 | 120 | 120 |
| Termination Time, psig | 13 | 15 | — | — |
| Termination Temp., °F. | 218 | 218 | 219 | 220 |
| Reactor pressure, psig | 100 | 100 | 50 | 50 |
| Recovered Resin | | | | |
| Flow Rates[6], g/10 min. | 5.9 | 9.0 | 7.9 | 7.0 |
| Added Antioxidant[7], wt. % | 1.25 | 1.25 | 1.25 | 1.25 |
| Added Wax[8], wt. % | 0.25 | 0.25 | 0.25 | 0.25 |
| Butadiene:Styrene | 24:76 | 24:76 | 24:76 | 24:76 |

-continued

Recipe 1

| Wt. Ratio | Run 1A | Run 1B | Run 1C | Run 1D |
|---|---|---|---|---|

(1) Parts by weight per 100 parts by weight of total monomer.
(2) The temperatures listed for Steps IA, IB, IIA, IIB, III, and IV are the recorded initial and final polymerization temperatures; the higher peak temperatures were not recorded.
(3) Small amounts of cyclohexane were used in each step (except Step VI) to flush the feed lines
(4) Epoxidized soybean oil; molecular weight: 980–1000; density: 1.03 g/cc; marketed by Sherex Co., Dublin, Ohio.
(5) The amount of $CO_2$ employed was that amount from a 350 ml container pressurized to 120 psig; about 1.4 grams, or about 0.1 phm.
(6) Determined at 200° C. according to ASTM D-1238, Condition G, employing a total weight of 5.0 kg.
(7) Tris(nonylphenyl)phosphite (TNPP), 1 wt. %; Irganox 1076, 0.25 wt. %.
(8) "Be Square" microcrystalline wax 195 marketed by Bareco, a Div. of Petrolite Corp., Tulsa, Oklahoma; used as an antiblocking agent.

Recipe 2

| | Run 2A | Run 2B | Run 2C |
|---|---|---|---|
| Step IA | | | |
| Cyclohexane, phm | 150 | 150 | 150 |
| Tetrahydrofuran, phm | 0.025 | 0.025 | 0.025 |
| Styrene, phm | 40 | 40 | 40 |
| n-Butyllithium, phm | 0.027 | 0.027 | 0.027 |
| Polymerization Time, min. | 12 | 12 | 11 |
| Polymerization, Temp., °F. | 130→161 | 132→167 | 134→167 |
| Reactor Pressure, psig | 28→30 | 25→32 | 25→30 |
| Step IB | | | |
| Cyclohexane, phm | 6.7 | 6.7 | 6.7 |
| 1,3-Butadiene, phm | 3 | 3 | 3 |
| Polymerization Time, min. | 15 | 19 | 17 |
| Polymerization Temp., °F. | 156 | 162 | 161 |
| Reactor Pressure, psig | 30 | 32 | 30 |
| Step IIA | | | |
| Cyclohexane, phm | 13.3 | 13.3 | 13.3 |
| n-Butyllithium, phm | 0.025 | 0.025 | 0.025 |
| Styrene, phm | 13 | 13 | 13 |
| Polymerization Time, min. | 11 | 10 | 10 |
| Polymerization Temp., °F. | 147→161 | 152→160 | 150→164 |
| Reactor Pressure, psig | 30→32 | 30→32 | 30→32 |
| Step IIB | | | |
| Cyclohexane, phm | 6.7 | 6.7 | 6.7 |
| 1,3-Butadiene, phm | 3 | 3 | 3 |
| Polymerization Time, min. | 17 | 15 | 15 |
| Polymerization Temp., °F. | 161 | 160 | 164 |
| Reactor Pressure, psig | 32 | 32 | 32 |
| Step III | | | |
| Cyclohexane, phm | 13.3 | 13.3 | 13.3 |
| n-Butyllithium, phm | 0.12 | 0.12 | 0.12 |
| Styrene, phm | 23 | 23 | 23 |
| Polymerization Time, min. | 10 | 14 | 10 |
| Polymerization Temp., °F. | 141→171 | 148→164 | 145→176 |
| Reactor Pressure, psig | 30→50 | 30→50 | 30→50 |
| Step IV | | | |
| Cyclohexane, phm | 6.7 | 6.7 | 6.7 |
| 1,3-Butadiene, phm | 18 | 18 | 18 |
| Polymerization Time, min. | 15 | 22 | 20 |
| Polymerization Temp., °F. | 171→213 | 164→219 | 176→217 |
| Reactor pressure, psig | 50 | 50 | 50 |
| Step V (Coupling) | | | |
| Cyclohexane, phm | 6.7 | 6.7 | 6.7 |
| Admex 711, phm | 0.4 | 0.4 | 0.4 |
| Coupling Time, min. | 20 | 20 | 20 |
| Coupling Temp., °F. | 213 | 219 | 217 |
| Reactor Pressure, psig | 50 | 50 | 50 |
| Step VI (Recovery) | | | |
| Water, phm | 0.22 | 0.22 | 0.22 |
| $CO_2$, psi | 120 | 120 | 120 |
| Termination Time, psig | 13 | 14 | 15 |
| Termination Temp., °F. | 217 | 219 | 219 |
| Reactor Pressure, psig | 100 | 100 | 100 |
| Recovered Resin | | | |
| Flow Rate, g/10 min. | 6.4 | 6.6 | 6.8 |
| Added Antioxidant, wt. % | 1.25 | 1.25 | 1.25 |
| Added Wax, wt. % | 0.25 | 0.25 | 0.25 |
| Butadiene:Styrene Wt. Ratio | 24:76 | 24:76 | 24:76 |

Footnotes to Recipe 1 also apply to Recipe 2.

Recipe 3

| | Run 3A | Run 3B | Run 3C |
|---|---|---|---|
| Step IA | | | |
| Cyclohexane, phm | 150 | 150 | 150 |
| Tetrahydrofuran, phm | 0.025 | 0.025 | 0.025 |
| Styrene, phm | 40 | 40 | 40 |
| n-Butyllithium, phm | 0.027 | 0.027 | 0.027 |
| Polymerization Time, min. | 12 | 12 | 12 |
| Polymerization, Temp., °F. | 136→165 | 156→166 | 136→165 |
| Reactor Pressure, psig | 29→30 | 25→30 | 25→30 |
| Step IB | | | |
| Cyclohexane, phm | 6.7 | 6.7 | 6.7 |
| 1,3-Butadiene, phm | 3 | 3 | 3 |
| Polymerization Time, min. | 15 | 15 | 15 |
| Polymerization Temp., °F. | 158 | 162 | 161 |
| Reactor Pressure, psig | 30 | 30 | 30 |
| Step IIA | | | |
| Cyclohexane, phm | 13.3 | 13.3 | 13.3 |
| n-Butyllithium, phm | 0.025 | 0.025 | 0.025 |
| Styrene, phm | 13 | 13 | 13 |
| Polymerization Time, min. | 10 | 10 | 10 |
| Polymerization Temp., °F. | 151→166 | 151→162 | 153→164 |
| Reactor Pressure, psig | 30→41 | 30→35 | 30→31 |
| Step IIB | | | |
| Cyclohexane, phm | 6.7 | 6.7 | 6.7 |
| 1,3-Butadiene, phm | 3 | 3 | 3 |
| Polymerization Time, min. | 14 | 16 | 15 |
| Polymerization Temp., °F. | 166 | 162 | 164 |
| Reactor Pressure, psig | 41 | 35 | 31 |
| Step III | | | |
| Cyclohexane, phm | 13.3 | 13.3 | 13.3 |
| n-Butyllithium, phm | 0.13 | 0.13 | 0.13 |
| Styrene, phm | 21 | 21 | 21 |
| Polymerization Time, min. | 15 | 14 | 10 |
| Polymerization Temp., °F. | 154→161 | 152→171 | 147→169 |
| Reactor Pressure, psig | 30→51 | 30→50 | 30→50 |
| Step IV | | | |
| Cyclohexane, phm | 6.7 | 6.7 | 6.7 |
| 1,3-Butadiene, phm | 20 | 20 | 20 |
| Polymerization Time, min. | 19 | 20 | 20 |
| Polymerization Temp., °F. | 161→218 | 171→219 | 169→215 |
| Reactor pressure, psig | 50 | 50 | 50 |
| Step V (Coupling) | | | |
| Cyclohexane, phm | 6.7 | 6.7 | 6.7 |
| Admex 711, phm | 0.4 | 0.4 | 0.4 |
| Coupling Time, min. | 20 | 20 | 19 |
| Coupling Temp., °F. | 218 | 219 | 215 |
| Reactor Pressure, psig | 50 | 50 | 50 |
| Step VI (Recovery) | | | |
| Water, phm | 0.22 | 0.22 | 0.22 |
| $CO_2$, psi | 120 | 120 | 120 |
| Termination Time, psig | 30 | 18 | 22 |
| Termination Temp., °F. | 220 | 220 | 218 |
| Reactor Pressure, psig | 100 | 100 | 100 |
| Recovered Resin | | | |
| Flow Rate, g/10 min. | 7.2 | 7.0 | 7.2 |
| Added Antioxidant, wt. % | 1.25 | 1.25 | 1.25 |
| Added Wax, wt. % | 0.25 | 0.25 | 0.25 |
| Butadiene:Styrene Wt. Ratio | 24:74 | 24:74 | 24:74 |

Footnotes to Recipe 1 also apply to Recipe 3.

EXAMPLE II

These data describe the preparation of coupled, resinous, polymodal butadiene-styrene copolymers employing two n-butyllithium initiator charges, three styrene charges, and three 1,3-butadiene charges, total 8, prior to coupling. Recipes 4, 5, and 6 were used for the preparation of seven representative, inventive resinous copolymers similarly as described in Example I.

|  | Recipe 4 | | |
|---|---|---|---|
|  | Run 4A | Run 4B | Run 4C |
| Step IA |  |  |  |
| Cyclohexane, phm | 157 | 157 | 157 |
| Tetrahydrofuran, phm | 0.025 | 0.025 | 0.025 |
| Styrene, phm | 37 | 37 | 37 |
| n-Butyllithium, phm | 0.032 | 0.032 | 0.032 |
| Polymerization Time, min. | 13 | 13 | 11 |
| Polymerization, Temp., °F. | 140→159 | 143→162 | 130→158 |
| Reactor Pressure, psig | 28→30 | 29→30 | 25→30 |
| Step IB |  |  |  |
| Cyclohexane, phm | 6.7 | 6.7 | 6.7 |
| 1,3-Butadiene, phm | 3 | 3 | 3 |
| Polymerization Time, min. | 15 | 15 | 15 |
| Polymerization Temp., °F. | 154 | 159 | 154 |
| Reactor Pressure, psig | 30 | 30 | 30 |
| Step IIA |  |  |  |
| Cyclohexane, phm | 6.7 | 6.7 | 6.7 |
| n-Butyllithium, phm | none | none | none |
| Styrene, phm | 16 | 16 | 16 |
| Polymerization Time, min. | 11 | 12 | 10 |
| Polymerization Temp., °F. | 153 | 156 | 149 |
| Reactor Pressure, psig | 30 | 32 | 30 |
| Step IIB |  |  |  |
| Cyclohexane, phm | 6.7 | 6.7 | 6.7 |
| 1,3-Butadiene, phm | 3 | 3 | 3 |
| Polymerization Time, min. | 22 | 15 | 22 |
| Polymerization Temp., °F. | 168 | 39 | 166 |
| Reactor Pressure, psig | 35 | 39 | 35 |
| Step III |  |  |  |
| Cyclohexane, phm | 13.3 | 13.3 | 13.3 |
| n-Butyllithium, phm | 0.15 | 0.15 | 0.15 |
| Styrene, phm | 23 | 23 | 23 |
| Polymerization Time, min. | 17 | 13 | 15 |
| Polymerization Temp., °F. | 148→170 | 153→173 | 146→162 |
| Reactor Pressure, psig | 30→50 | 30→50 | 30→50 |
| Step IV |  |  |  |
| Cyclohexane, phm | 6.7 | 6.7 | 6.7 |
| 1,3-Butadiene, phm | 18 | 18 | 18 |
| Polymerization Time, min. | 18 | 20 | 20 |
| Polymerization Temp., °F. | 170→219 | 173→219 | 162→216 |
| Reactor pressure, psig | 50 | 50 | 50 |
| Step V (Coupling) |  |  |  |
| Cyclohexane, phm | 6.7 | 6.7 | 6.7 |
| Admex 711, phm | 0.4 | 0.4 | 0.4 |
| Coupling Time, min. | 20 | 20 | 17 |
| Coupling Temp., °F. | 219 | 219 | 216 |
| Reactor Pressure, psig | 50 | 50 | 50 |
| Step VI (Recovery) |  |  |  |
| Water, phm | 0.22 | 0.22 | 0.22 |
| $CO_2$, psi | 120 | 120 | 120 |
| Termination Time, psig | 24 | 15 | 22 |
| Termination Temp., °F. | 221 | 220 | 219 |
| Reactor Pressure, psig | 100 | 100 | 100 |
| Recovered Resin |  |  |  |
| Flow Rate, g/10 min | 4.9 | 3.9 | 5.2 |
| Added Antioxidant, wt. % | 1.25 | 1.25 | 1.25 |
| Added Wax, wt. % | 0.25 | 0.25 | 0.25 |
| Butadiene:Styrene Wt. Ratio | 24:76 | 24:76 | 24:76 |

Footnotes to Recipe 1 also apply to Recipe 4.

|  | Recipe 5 | | Recipe 6 | |
|---|---|---|---|---|
|  | Run 5A | Run 5B | Run 6A | Run 6B |
| Step IA |  |  |  |  |
| Cyclohexane, phm | 157 | 157 | 157 | 157 |
| Tetrahydrofuran, phm | 0.025 | 0.025 | 0.025 | 0.025 |
| Styrene, phm | 37 | 37 | 37 | 37 |
| n-Butyllithium, phm | 0.035 | 0.035 | 0.030 | 0.032 |
| Polymerization Time, min. | 20 | 28 | 16 | 18 |
| Polymerization, Temp., °F. | 134→151 | 127→154 | 125→150 | 129→154 |
| Reactor Pressure, psig | 29→30 | 29→30 | 25→31 | 25→30 |
| Step IB |  |  |  |  |
| Cyclohexane, phm | 6.7 | 6.7 | 6.7 | 6.7 |
| 1,3-Butadiene, phm | 3 | 3 | 3 | 3 |
| Polymerization Time, min. | 15 | 15 | 15 | 20 |
| Polymerization Temp., °F. | 142 | 145 | 146 | 152 |
| Reactor Pressure, psig | 32 | 30 | 31 | 30 |
| Step IIA |  |  |  |  |
| Cyclohexane, phm | 13.3 | 13.3 | 13.3 | 13.3 |
| n-Butyllithium, phm | none | none | none | none |
| Styrene, phm | 16 | 16 | 16 | 16 |
| Polymerization Time, min. | 15 | 15 | 18 | 15 |
| Polymerization Temp., °F. | 142→159 | 141→160 | 145→157 | 150→161 |
| Reactor pressure, psig | 32→35 | 31→40 | 35 | 30→32 |
| Step IIB |  |  |  |  |
| Cyclohexane, phm | 6.7 | 6.7 | 6.7 | 6.7 |
| 1,3-Butadiene, phm | 3 | 3 | 3 | 3 |
| Polymerization Time, min. | 14 | 15 | 15 | 15 |
| Polymerization Temp., °F. | 159 | 160 | 157 | 161 |
| Reactor Pressure, psig | 35 | 40 | 35 | 32 |
| Step III |  |  |  |  |
| Cyclohexane, phm | 13.3 | 13.3 | 13.3 | 13.3 |
| n-Butyllithium, phm | 0.12 | 0.14 | 0.15 | 0.14 |
| Styrene, phm | 21 | 21 | 21 | 21 |
| Polymerization Time, min. | 15 | 17 | 17 | 16 |
| Polymerization Temp., °F. | 146→162 | 145→163 | 145→161 | 147→162 |
| Reactor Pressure, psig | 30→50 | 30→50 | 30→50 | 31→50 |
| Step IV |  |  |  |  |
| Cyclohexane, phm | 6.7 | 6.7 | 6.7 | 6.7 |
| 1,3-Butadiene, phm | 20 | 20 | 20 | 20 |
| Polymerization Time, min. | 20 | 20 | 15 | 20 |
| Polymerization Temp., °F. | 162→218 | 163→217 | 161→215 | 162→218 |
| Reactor pressure, psig | 50 | 50 | 50 | 50 |
| Step V (Coupling) |  |  |  |  |
| Cyclohexane, phm | 6.7 | 6.7 | 6.7 | 6.7 |
| Admex 711, phm | 0.4 | 0.4 | 0.4 | 0.4 |
| Coupling Time, min. | 20 | 20 | 20 | 20 |
| Coupling Temp., °F. | 218 | 217 | 215 | 218 |
| Reactor Pressure, psig | 50 | 50 | 50 | 50 |
| Step VI (Recovery) |  |  |  |  |
| Water, phm | 0.22 | 0.22 | 0.22 | 0.22 |
| $CO_2$, psi | 120 | 120 | 120 | 120 |
| Termination Time, psig | 26 | 18 | 19 | 20 |
| Termination Temp., °F. | 221 | 222 | 219 | 220 |
| Reactor Pressure, psig | 70→100 | 70→100 | 100 | 100 |
| Recovered Resin |  |  |  |  |
| Flow Rate, g/10 min. | 7.6 | 10.2 | 6.2 | 6.5 |
| Added Antioxidant, wt. % | 1.25 | 1.25 | 1.25 | 1.25 |
| Added Wax, wt. % | 0.25 | 0.25 | 0.25 | 0.25 |
| Butadiene:Styrene Wt. Ratio | 26:74 | 26:74 | 26:74 | 26:74 |

Footnotes to Recipe 1 also apply to Recipes 5 and 6.

EXAMPLE III

These data describe the preparation of coupled, resinous, polymodal butadiene-styrene copolymers employing three n-butyllithium charges, three styrene charges, and two 1,3-butadiene charges, total 8, prior to coupling. Recipes 7 and 8 were used for the preparation of seven representative, inventive, resinous copolymer samples similarly as described in Example I.

|  | Recipe 7 | | | |
|---|---|---|---|---|
|  | Run 7A | Run 7B | Run 7C | Run 7D |
| Step IA | | | | |
| Cyclohexane, phm | 157 | 157 | 157 | 157 |
| Tetrahydrofuran, phm | 0.025 | 0.025 | 0.025 | 0.025 |
| Styrene, phm | 37 | 37 | 37 | 37 |
| n-Butyllithium, phm | 0.030 | 0.030 | 0.030 | 0.030 |
| Polymerization Time, min. | 14 | 14 | 15 | 14 |
| Polymerization Temp., °F. | 134→152 | 126→151 | 132→152 | 126→147 |
| Reactor Pressure, psig | 29→30 | 29→30 | 25→30 | 25→30 |
| Step IB | | | | |
| Cyclohexane, phm | — | — | — | — |
| 1,3-Butadiene, phm | none | none | none | none |
| Polymerization Time, min. | — | — | — | — |
| Polymerization Temp., °F. | — | — | — | — |
| Reactor Pressure, psig | — | — | — | — |
| Step IIA | | | | |
| Cyclohexane, phm | 13.3 | 13.3 | 13.3 | 13.3 |
| n-Butyllithium, phm | 0.030 | 0.030 | 0.030 | 0.030 |
| Styrene, phm | 16 | 16 | 16 | 16 |
| Polymerization Time, min. | 12 | 12 | 12 | 12 |
| Polymerization Temp., °F. | 172→159 | 159→162 | 159→164 | 156 |
| Reactor Pressure, psig | 30→32 | 30→35 | 30→35 | 30→32 |
| Step IIB | | | | |
| Cyclohexane, phm | 6.7 | 6.7 | 6.7 | 6.7 |
| 1,3-Butadiene, phm | 6 | 6 | 6 | 6 |
| Polymerization Time, min. | 24 | 12 | 15 | 25 |
| Polymerization Temp., °F. | 159 | 162 | 164 | 156 |
| Reactor Pressure, psig | 32 | 35 | 35 | 32 |
| Step III | | | | |
| Cyclohexane, phm | 13.3 | 13.3 | 13.3 | 13.3 |
| n-Butyllithium, phm | 0.11 | 0.10 | 0.10 | 0.10 |
| Styrene, phm | 23 | 23 | 23 | 23 |
| Polymerization Time, min. | 12 | 12 | 12 | 12 |
| Polymerization Temp., °F. | 147→164 | 153→183 | 148→169 | 143→171 |
| Reactor Pressure, psig | 30→50 | 30→50 | 30→50 | 20→50 |
| Step IV | | | | |
| Cyclohexane, phm | 6.7 | 6.7 | 6.7 | 6.7 |
| 1,3-Butadiene, phm | 18 | 18 | 18 | 18 |
| Polymerization Time, min. | 20 | 20 | 20 | 20 |
| Polymerization Temp., °F. | 164→217 | 183→217 | 169→217 | 171→217 |
| Reactor Pressure, psig | 50 | 50 | 50 | 50 |
| Step V (Coupling) | | | | |
| Cyclohexane, phm | 6.7 | 6.7 | 6.7 | 6.7 |
| Admex 711, phm | 0.4 | 0.4 | 0.4 | 0.4 |
| Coupling Time, min. | 15 | 15 | 15 | 15 |
| Coupling Temp., °F. | 217 | 217 | 217 | 217 |
| Reactor Pressure, psig | 50 | 50 | 50 | 50 |
| Step VI (Recovery) | | | | |
| Water, phm | 0.22 | 0.22 | 0.22 | 0.22 |
| $CO_2$, psi | 120 | 120 | 120 | 120 |
| Termination Time, psig | 18 | 15 | 8 | 18 |
| Termination Temp., °F. | 219 | 219 | 219 | 219 |
| Reactor Pressure, psig | 100 | 100 | 100 | 100 |
| Recovered Resin | | | | |
| Flow Rate, g/10 min. | 8.4 | 6.9 | 7.3 | 7.1 |
| Added Antioxidant, wt. % | 1.25 | 1.25 | 1.25 | 1.25 |
| Added Wax, wt. % | 0.25 | 0.25 | 0.25 | 0.25 |
| Butadiene:Styrene Wt. Ratio | 24:76 | 24:76 | 24:76 | 24:76 |

Footnotes to Recipe I also apply to Recipe 7.

|  | Recipe 8 | | |
|---|---|---|---|
|  | Run 8A | Run 8B | Run 8C |
| Step IA | | | |
| Cyclohexane, phm | 157 | 157 | 157 |
| Tetrahydrofuran, phm | 0.025 | 0.025 | 0.025 |
| Styrene, phm | 37 | 37 | 37 |
| n-Butyllithium, phm | 0.030 | 0.030 | 0.030 |
| Polymerization Time, min. | 13 | 15 | 17 |
| Polymerization, Temp., °F. | 136→155 | 156→157 | 131→152 |
| Reactor Pressure, psig | 26→30 | 29→32 | 29→30 |
| Step IB | | | |
| Cyclohexane, phm | — | — | — |
| 1,3-Butadiene, phm | none | none | none |
| Polymerization Time, min. | — | — | — |
| Polymerization Temp., °F. | — | — | — |
| Reactor Pressure, psig | — | — | — |
| Step IIA | | | |
| Cyclohexane, phm | 13.3 | 13.3 | 13.3 |
| n-Butyllithium, phm | 0.030 | 0.030 | 0.030 |
| Styrene, phm | 16 | 16 | 16 |
| Polymerization Time, min. | 12 | 15 | 12 |
| Polymerization Temp., °F. | 167→159 | 167→156 | 164→154 |
| Reactor Pressure, psig | 30→31 | 30→31 | 30 |
| Step IIB | | | |
| Cyclohexane, phm | 6.7 | 6.7 | 6.7 |
| 1,3-Butadiene, phm | 6 | 6 | 6 |
| Polymerization Time, min. | 10 | 15 | 17 |
| Polymerization Temp., °F. | 30 | 31 | 30 |
| Reactor Pressure, psig | 30 | 31 | 30 |
| Step III | | | |
| Cyclohexane, phm | 13.3 | 13.3 | 13.3 |
| n-Butyllithium, phm | 0.12 | 0.11 | 0.11 |
| Styrene, phm | 22 | 22 | 22 |
| Polymerization Time, min. | 15 | 15 | 12 |
| Polymerization Temp., °F. | 160→50 | 147→165 | 143→175 |
| Reactor Pressure, psig | 30→50 | 30→50 | 30→50 |
| Step IV | | | |
| Cyclohexane, phm | 6.7 | 6.7 | 6.7 |
| 1,3-Butadiene, phm | 19 | 19 | 19 |
| Polymerization Time, min. | 17 | 20 | 20 |
| Polymerization Temp., °F. | 164→218 | 165→219 | 175→218 |
| Reactor Pressure, psig | 50 | 50 | 50 |
| Step V (Coupling) | | | |
| Cyclohexane, phm | 6.7 | 6.7 | 6.7 |
| Admex 711, phm | 0.4 | 0.4 | 0.4 |
| Coupling Time, min. | 15 | 15 | 15 |
| Coupling Temp., °F. | 218 | 219 | 218 |
| Reactor Pressure, psig | 50 | 50 | 50 |
| Step VI (Recovery) | | | |
| Water, phm | 0.22 | 0.22 | 0.22 |
| $CO_2$, psi | 120 | 120 | 120 |
| Termination Time, psig | 20 | 23 | 14 |
| Termination Temp., °F. | 220 | 220 | 220 |
| Reactor Pressure, psig | 100 | 100 | 105 |
| Recovered Resin | | | |
| Flow Rate, g/10 min. | 9.0 | 7.5 | 7.6 |
| Added Antioxidant, wt. % | 1.25 | 1.25 | 1.25 |
| Added Wax, wt. % | 0.25 | 0.25 | 0.25 |
| Butadiene:Styrene Wt. Ratio | 25:75 | 25:75 | 25:75 |

Footnotes to Recipe 1 also apply to Recipe 8.

EXAMPLE IV

In this example, typical recipes for preparing coupled, resinous, polymodal, butadiene-styrene control resins, essentially in accordance with the procedure given in Example I of U.S. Pat. No. 3,639,517, are described. Recipes 9, 10, and 11 list average polymerization parameters of numerous representative control runs:

|  | Control Recipes 9, 10, and 11 | | |
|---|---|---|---|
|  | Run 9 | Run 10 | Run 11 |
| Step IA | | | |

| -continued | | | |
|---|---|---|---|
| Control Recipes 9, 10, and 11 | | | |
| | Run 9 | Run 10 | Run 11 |
| Cyclohexane, phm | 167 | 167 | 167 |
| Tetrahydrofuran, phm | 0.025 | 0.025 | 0.025 |
| Styrene, phm | 33 | 33 | 33 |
| n-Butyllithium, phm | 0.030–0.034 | 0.030–0.034 | 0.030 |
| Polymerization Time, min. | 15–20 | 15–20 | 17–20 |
| Polymerization, Temp., °F. | 110–170 | 110–170 | 110–170 |
| Reactor Pressure, psig | 30 | 30 | 30 |
| Step IB | | | |
| Cyclohexane, phm | — | — | — |
| 1,3-Butadiene, phm | none | none | none |
| Polymerization Time, min. | — | — | — |
| Polymerization Temp., °F. | — | — | — |
| Reactor Pressure, psig | — | — | — |
| Step IIA | | | |
| Cyclohexane, phm | 6.7 | 6.7 | 6.7 |
| n-Butyllithium, phm | none | none | none |
| Styrene, phm | 20 | 20 | 15 |
| Polymerization Time, min. | 15–20 | 15–20 | 15–20 |
| Polymerization Temp., °F. | 140–180 | 140–180 | 140–180 |
| Reactor Pressure, psig | 30–40 | 30–40 | 30–40 |
| Step IIB | | | |
| Cyclohexane, phm | — | — | — |
| 1,3-Butadiene, phm | none | none | none |
| Polymerization Time, min. | — | — | — |
| Polymerization Temp., °F. | — | — | — |
| Reactor Pressure, psig | — | — | — |
| Step III | | | |
| Cyclohexane, phm | 13.3 | 13.3 | 13.3 |
| n-Butyllithium, phm | 0.12–0.14 | 0.12–0.14 | 0.14 |
| Styrene, phm | 23 | 23 | 26 |
| Polymerization Time, min. | 15–20 | 15–20 | 15–20 |
| Polymerization Temp., °F. | 140–180 | 140–180 | 140–180 |
| Reactor Pressure, psig | 30–40 | 30–40 | 30–40 |
| Step IV | | | |
| Cyclohexane, phm | 6.7 | 6.7 | 6.7 |
| 1,3-Butadiene, phm | 24 | 24 | 26 |
| Polymerization Time, min. | 15–20 | 15–20 | 15–20 |
| Polymerization Temp., °F. | 100–225 | 100–225 | 150–225 |
| Reactor pressure, psig | 30–50 | 30–50 | 30–50 |
| Step V (Coupling) | | | |
| Cyclohexane, phm | 6.7 | 6.7 | 6.7 |
| Admex 711, phm | 0.40 | 0.40 | 0.40 |
| Coupling Time, min. | 10–15 | 10–15 | 10–15 |
| Coupling Temp., °F. | 215–225 | 215–225 | 215–225 |
| Reactor Pressure, psig | 40–50 | 40–50 | 40–50 |
| Step VI (Recovery) | | | |
| Water, phm | 0.22 | 0.22 | 0.22 |
| $CO_2$, psi | 120 | 120 | 120 |
| Termination Time, psig | 10–15 | 10–15 | 10–15 |
| Termination Temp., °F. | 210–220 | 210–220 | 210–220 |
| Reactor Pressure, psig | 50–100 | 50–100 | 50–100 |
| Recovered Resin | | | |
| Flow Rate, g/10 min. | — | — | — |
| Added Antioxidant, wt. % | 1.25 | 1.25 | 1.25 |
| Added Wax, wt. % | 0.25 | 0.25 | 0.25 |
| Butadiene:Styrene Wt. Ratio | 24:76 | 24:76 | 26:74 |

Footnotes to Recipe 1 also apply to Recipes 9, 10, and 11.

EXAMPLE V

In this Example, physical properties of the coupled, polymodal, butadiene-styrene resins prepared in accordance with Recipes 1 through 11 inclusive are described. Approximately equal amounts of resins prepared in equivalent runs (about 3 lb per run) were blended by first manually shaking the portions of resins together in a carton drum for about 1 minute and then feeding the mixture through a grinder to produce the blend. Prepared blends are listed in Table V:

TABLE V

| Resin Blend | Runs for Preparing Blend Components | Bd.:Styr. Wt. Ratio | Flow Rate | $M_w^{(3)} \times 10^{-3}$ | $M_n^{(3)} \times 10^{-3}$ |
|---|---|---|---|---|---|
| Resin 1 | Runs 1A, 1B, 1C, 1D | 24:76 | 7.4 | 158 | 93 |
| Resin 2 | Runs 2A, 2B, 2C | 24:76 | 7.3 | 189 | 114 |
| Resin 3 | Runs 3A, 3B, 3C | 26:74 | 6.7 | 188 | 112 |
| Resin 4 | Runs 4A, 4B, 4C | 24:76 | 4.1 | 186 | 99 |
| Resin 5 | Runs 5A, 5B | 26:74 | 8.3 | 157 | 96 |
| Resin 6 | Runs 6A, 6B | 26:74 | 6.2 | 177 | 100 |
| Resin 7 | Runs 7A, 7B, 7C, 7D | 24:76 | 7.5 | 174 | 115 |
| Resin 8 | Runs 8A, 8B, 8C | 24:76 | 8.2 | 173 | 109 |
| Resin 9 | Seven Run 9 resins | 24:76 | 6.3 | —[1] | — |
| Resin 10 | Eight Run 10 resins | 24:76 | 7.3 | — | — |
| Resin 11 | Three Run 11 resins | 26:74 | 7.4 | — | — |
| Resin 12 | Control Resin[2] | 24:76 | 7.7 | 170–200 | 90–120 |
| Resin 13 | Control Resin[2] | 24:76 | 8.4 | 170–200 | 90–120 |
| Resin 14 | Control Resin[2] | 24:76 | 7.7 | 170–200 | 90–120 |

[1] a dash indicates not determined.
[2] commercially available, coupled, resinous butadiene-styrene copolymer, prepared essentially in accordance with Recipes 9 and 10; marketed by Phillips Chemical Co., Bartlesville, OK, as K-Resin ® resin KRO3.
[3] weight average molecular weight ($M_w$) and number average molecular weight ($M_n$), as determined from gel permeation chromatography curves according to the procedure described by G. Kraus and C. Stacy in J. Poly. Sci. A-2, 10, 657 (1972) and J. Poly. Sci. Symposium No. 43, 329 (1973); actual molecular weights are in thousands, e.g., resin has $M_w$ of 158,000.

The dry-mixed blends were molded in an Arburg 221 E/150, 1½ ounce molding machine at a barrel temperature of about 210° C., a mold temperature of about 50° C., a screw speed setting of about 200, an injection pressure ranging from about 54 to 57 KP/cm², and a total cycle time of 35 seconds. Physical properties of molded specimens are listed in Table VI:

TABLE VI

| Resin | Hunter "b" Value[1] | Haze[2] % | Craze[3] | Gardner Impact[4] (cm. kg) | | | Tensile Strength[5] (Yield, psi) | Elong.[5] (%) | Flex Modulus[6] (psi) | Defl.[7] Temp. (°F.) | Hardness[8] (Shore D) |
|---|---|---|---|---|---|---|---|---|---|---|---|
| | | | | Disk | Bowl | Sheet | | | | | |
| 1 (Invention) | −3.0 | 1.8 | No | — | 12.0 | 1.2 | 4910 | 289 | 193,000 | 176 | 73 |
| 2 (Invention) | −4.7 | 1.7 | No | 116 | 5.0 | 1.5 | 4420 | 282 | 189,000 | 172 | 71 |
| 4 (Invention) | −4.7 | 2.1 | No | 99 | 4.4 | 1.4 | 4450 | 285 | 183,000 | 181 | 70 |
| 7 (Invention) | −2.5 | 0.9 | No | 93 | 39.0 | 2.0 | 4420 | 300 | 196,000 | 185 | 68 |

TABLE VI-continued

| Resin | Hunter "b" Value[1] | Haze[2] % | Craze[3] | Gardner Impact[4] (cm. kg) | | | Tensile Strength[5] (Yield, psi) | Elong.[5] (%) | Flex Modulus[6] (psi) | Defl.[7] Temp. (°F.) | Hardness[8] (Shore D) |
|---|---|---|---|---|---|---|---|---|---|---|---|
| | | | | Disk | Bowl | Sheet | | | | | |
| 8 (Invention) | −3.8 | 0.7 | No | 91 | 47.0 | 1.5 | 4040 | 289 | 192,000 | 181 | 69 |
| 9 (Control) | −11.6 | 1.9 | Yes | 106 | — | 1.2 | 4720 | 210 | 241,000 | 209 | 67 |
| 10 (Control) | −11.1 | 1.7 | Yes | 103 | — | 1.0 | 4570 | 214 | 239,000 | 209 | 67 |
| 12 (Control) | −12.2 | 1.3 | Yes | 111 | 3.8 | 1.5 | 4600 | 241 | 247,000 | 194 | 67 |
| 13 (Control) | −17.2 | 3.6 | Yes | — | 3.2 | 14.8 | 4250 | 204 | 230,000 | 188 | 65 |
| 14 (Control) | −10.8 | 1.4 | Yes | 101 | 8.8 | 8.8 | 4700 | 249 | 247,000 | 193 | 67 |
| 3 (Invention) | −5.2 | 2.1 | No | 114 | 42.0 | 2.1 | 4180 | 282 | 176,000 | 173 | 67 |
| 5 (Invention) | −5.5 | 1.2 | No | 120 | — | 1.0 | 4257 | 316 | 196,000 | 195 | 72 |
| 6 (Invention) | −8.7 | 1.8 | No | 120 | — | 1.1 | 4019 | 276 | 187,000 | 194 | 72 |
| 11 (Control) | −15.1 | 1.7 | Yes | 95 | — | — | 4210 | 221 | 223,000 | 206 | 65 |

[1]tristumulus value "b" is a measure of blue and yellow tint: −b = blue m, +b = yellow; measured with a Hunter Lab Color Difference Meter 25 DM using injection molded (350° F./30 tons/2 minutes) resin disks of 0.15 inch thickness and 2.5 inch diameter. Measurements were against a black background.
[2]determined with a Gardner hazemeter according to ASTM 1003, using test specimens of 50 mil thickness.
[3]determined by visual inspection of the ductile indentation made on an injection molded disk 0.05 inch thick when impacted in a Gardner Impact Test using a 4 lb round dart (about 0.5 inch diameter) dropped from a height of 15–20 inches.
[4]determined according to Instruction Manual IG-1120 Gardner Laboratories, using a 4 lb-weight; thickness of disk (injection molded at 210° C.): 0.05 inch; thickness of bowl (injection molded at 210° C.): 0.05 inch; thickness of sheet (extruded at 177° C. on a Kinney extruder, at a shear rate of 450 sec⁻¹: 0.01 inch; disks were edge gated, bowls were center gated.
[5]determined according to ASTM D-638.
[6]determined according to ASTM D-790.
[7]Vicat deflection temperature, determined according to ASTM D-648.
[8]determined according to ASTM D-2240.

Data in Table VI clearly show at least two significant improvements in properties of my Inventive Resins Runs 1–8 inclusive vs. control resins Runs 9–12: less blue color (lower negative Hunter "b" value), and no crazing and opaqueness upon impact. Tensile strength and hardness were comparable for inventive and control resins, whereas flexural modulus tended to be somewhat lower for inventive polymers, though not undesirably so. The Vicat deflection temperatures seemed to trend slightly lower for the inventive resins. Gardner impact of disks is comparable for inventive and control resins; bowl impact is generally higher for inventive resins, while sheet impact is lower for inventive resins. Based on bowl impact data, Resins 7 and 8 prepared with three n-butyllithium initiator charges, three styrene charges, and two butadiene charges, total 9 before coupling, presently are most preferred.

tained Step IIB (absent in recipes of Control Runs 9–11) employing 5–12 phm butadiene. The time for polymerizing the first butadiene charge in Step IIB was about 15 minutes. Temperature and pressure were about the same as listed for Step IIA (see recipes of Control Runs 9–11). It is expected that the following polymeric species before coupling were formed: S-S-B-S-B-Li and S-B-Li.

Control Run 19 was essentially the same as Control Runs 9–11 (Recipe in Example IV).

Monomer charges in polymerization Control Runs 9, 10, and Control Runs 15–19 inclusive, plus some key physical properties of formed resins are summarized in Table VII. NBL (n-butyllithium) charges (in phm) are designated $L_1$, $L_2$, $L_3$; styrene charges (in phm) are designated $S_1$, $S_2$, $S_3$; and butadiene charges (in phm) are designated $B_1$, $B_2$.

TABLE VII

| Run Charge | 15 | 16 | 17 | 9 | 10 | 18 | 19 |
|---|---|---|---|---|---|---|---|
| $S_1$ | 26.4 | 26.4 | 26.4 | 33 | 33 | 22 | 25.5 |
| $L_1$ | 0.04 | 0.04 | 0.04 | 0.03 | 0.03 | 0.03 | 0.035 |
| $S_2$ | 26.6 | 26.6 | 26.6 | 20 | 20 | 22 | 25.5 |
| $B_1$ | 12 | 5 | 5 | 0 | 0 | 8 | 0 |
| $L_2$ | 0.13 | 0.13 | 0.13 | 0.13 | 0.13 | 0.13 | 0.145 |
| $S_3$ | 23 | 23 | 23 | 23 | 23 | 29 | 22 |
| $B_2$ | 12 | 19 | 19 | 24 | 24 | 19 | 27 |
| Wt-% Butadiene | 24 | 24 | 24 | 24 | 24 | 27 | 27 |
| Wt-% Styrene | 76 | 76 | 76 | 76 | 76 | 73 | 73 |
| Flow Rate | 4.0 | 12.5 | 3.6 | — | — | 4.2 | 7.7 |
| Haze (%) | 15.4 | 20.7 | 28.0 | 1.9 | 1.7 | 28.8 | 6.4 |
| Dart Impact[1] | —[2] | >81 | >81 | — | — | >81 | >80 |
| Tensile Strength[3] | 2.42 | — | 2.98 | 4.72 | 4.57 | 2.26 | 2.53 |

[1]determined in accordance with ASTM D 1709-75; given in inch-lb.
[2]a dash indicates not determined.
[3]at yield; given in Kpsi

EXAMPLE VI

In this example the polymerization and properties of control resins Runs 15–19 inclusive are described.

Control Resins 15–18 inclusive which were prepared with two n-butyllithium (NBL) initiator charges, three styrene charges, and two butadiene charges. The recipes for Control Runs 15–18 were essentially the same as the recipes for Control Runs 9–11 except that in Control Runs 15–18 a portion of butadiene was added after the second styrene charges and before the second and final NBL charge, i.e., recipes of Control Runs 15–18 con- Data in Table VII show that the control resins of Runs 15–18 inclusive employing two butadiene charges did not exhibit strength and impact advantages versus the control resins of Runs 9, 10, and 19 prepared with only one butadiene charge. In addition, the resins produced in Control Runs 15–18 inclusive possessed unacceptable high haze.

The control resin of Run 19 showed tensile similar to Runs 15, 17, 18; a somewhat better but still unsatisfactory haze as compared to Runs 15–19, though not as good as, Control Runs 9–10. None of these control copolymers were acceptable for clear copolymer usages requiring excellent mechanical properties.

EXAMPLE VII

Comparative resinous 76:24 weight ratio styrene:-butadiene copolymers were employing a charge sequence of a single initiator charge, three incremental monovinylarene charges, and a single (final) conjugated diene charge (charge order L/S, S, S, B), followed by coupling. Anticipated species formed would be: S-B-L prior to coupling. Otherwise, the conditions employed were essentially similar to Recipe 1 above.

The so-prepared coupled resinous copolymers employing a single initiator charge do not exhibit any significant polymodality, despite multiple monomer additions.

These copolymers, while resinous, fairly transparent, with satisfactory flexural modulus and tensile, thus suitable for many purposes (importantly) shatter at only about 10-inch-lbs. Satisfactory craze resistant copolymers pass the test at about 60 inch-lbs and above, using the test shown in my Table VI footnote 3.

EXAMPLE VIII

The size and makeup of the polymeric species considered to be present in some of the above-described resinous, polymodal, butadiene-styrene copolymers are depicted below.

$S_1$, $S_2$, $S_3$, each represents a block of polymonovinylarene formed after addition of and substantial completion of polymerization of a charge of monomeric monovinylarene. The subscripts indicate the order of formation.

$B_1$, $B_2$, $B_3$, each represents a block of polyconjugated diene formed after addition of and substantial completion of polymerization of a charge of monomeric conjugated diene. The subscripts indicate the order of formation.

L represents the initiator residue on the end of a polymer-chain prior to any termination or coupling of the chain. Mode A, Inventive Resins 1, 2, and 3, prepared with three initiator charges, three styrene charges, and three butadiene charges, form an in situ mixture of the following three primary species before coupling since each NBL addition initiates a new polymer chain:

$S_1$-$B_1$-$S_2$-$B_2$-$S_3$-$B_3$-L
$S_2$-$B_2$-$S_3$-$B_3$-L
$S_3$-$B_3$-L.

Mode B, Inventive Resins 4, 5, and 6, prepared with two initiator charges, three butadiene charges, and three styrene charges, form an in situ the following two primary species before coupling:

$S_1$-$B_1$-$S_2$-$B_2$-$S_3$-$B_3$-L
$S_3$-$B_3$-L.

Mode C, Inventive Resins 7 and 8, prepared with three initiator charges, two butadiene charges, and three styrene charges, form the following three primary species before coupling:

$S_1$-$S_2$-$B_1$-$S_3$-$B_2$-L
$S_2$-$B_1$-$S_3$-$B_2$-L
$S_3$-$B_2$-L.

Control Resins 9-14, prepared with two initiator charges, three styrene charges, and one butadiene charge, form the following two primary species before coupling:

$S_1$-$S_2$-$S_3$-B-L
$S_3$-B-L.

Control resins prepared with two initiator charges, three styrene charges, and two butadiene charges, form the following primary species before coupling:

$S_1$-$S_2$-$B_1$-$S_3$-$B_2$-L
$S_3$-$B_2$-L.

Of course, in any sequence of solution polymerization stages, traces of initiator poisons, when present or introduced with feed streams, can cause termination of a few growing chains. For example, after the first stage, a small amount of S block polymer likely is present.

The sizes of the various S and B blocks, as well as B/S ratios and molecular weights of the different polymer species can be estimated. The method of calculation for these estimates is exemplified for Inventive Resin 1 (Recipe 1)(all calculations are based on assumption that no initiator poisons were present, and that initiation rates and propagation rates were equal).

| Initiator charges (NBL): | |
|---|---|
| $L_1$ (Steps IA/IB): | 0.025 phm = 0.39 mhm |
| $L_2$ (Steps IIA/IIB): | 0.025 phm = 0.39 mhm |
| $L_3$ (Steps III/IV): | 0.11 phm = 1.72 mhm |
| | NBL Total = 2.50 mhm |
| | (g-millimoles per 100 g monomers) |

Steps IA/IB 37 phm styrene and 3 phm butadiene polymerize to form $(S_1-B_1)_x$—Li polymer chains where Li=lithium.

Steps IIA/IIB

A portion of added 16 phm styrene and of 3 phm butadiene polymerizes onto the existing $(S_1-B_1)_x$—Li polymer chains; this portion is $$\frac{L_1}{L_1 + L_2}.$$

Thus 8.0 phm styrene and 1.5 phm butadiene form $S_2$ and $B_2$ blocks attached to $S_1-B_1$ to form $(S_1-B_1)_x-(S_2-B_2)_y$—Li. The other portion, $$\frac{L_2}{L_1 + L_2},$$

of styrene and butadiene forms new polymer chains initiated with $L_2$. Thus, 8 phm styrene and 1.5 phm butadiene form new polymer chains $(S_2-B_2)_y$—Li. It is assumed that the propagation rate of both chains is the same.

Steps III/IV

The portion of 23 phm styrene and 18 phm butadiene polymerized onto $(S_1-B_1)_x-(S_2-B_2)_y$—Li chains is $$\frac{L_1}{L_1 + L_2 + L_3}.$$

Thus $$\frac{0.39}{2.50} \times 23 = 3.6 \text{ phm } S_3$$

and $$\frac{0.39}{2.50} \times 18 = 2.8 \text{ phm } B_3$$

are polymerized to form $(S_1-B_1)_x-(S_2-B_2)_y-(S_3-B_3)_z-\text{Li}$ chains.

The portion of styrene and butadiene polymerized onto $(B_2-S_2)_y-\text{Li}$ chains is $$\frac{L_2}{L_1 + L_2 + L_3}.$$

Thus 3.6 phm $S_3$ and 2.8 phm $B_3$ are polymerized to form $(S_2-B_2)_y-(S_3-B_2)_z-\text{Li}$ chains. The portion of styrene and butadiene that forms newly initiated $(S_3-B_2)_z-\text{Li}$ polymer chains is $$\frac{L_3}{L_1 + L_2 + L_3}.$$

Thus $$\frac{1.72}{2.50} \times 23 = 15.8 \text{ phm } S_3$$

and $$\frac{1.72}{2.50} \times 18 = 12.4 \text{ phm } B_3$$

are polymerized to form $(S_3-B_3)_z-\text{Li}$ polymer chains. It is assumed that the propagation rate of each chain is the same.

The molecular weights ($M_n$) of the species before coupling can be estimated by dividing the number of phms of monomers in each chain (species) by the number of moles of Li associated with each chain:

| | | |
|---|---|---|
| 37.0 3.0 8.0 1.5 3.6 2.8<br>$S_1-B_1-S_2-B_2-S_3-B_3$ | $M_n = \dfrac{55.9}{0.39 \times 10^{-3}}$ | = 143,000 |
| 8.0 1.5 3.6 2.8<br>$S_2-B_2-S_3-B_3$ | $M_n = \dfrac{25.9}{0.39 \times 10^{-3}}$ | = 41,000 |
| 15.8 12.4<br>$S_3-B_3$ | $M_n = \dfrac{28.2}{1.72 \times 10^{-3}}$ | = 16,000 |

The described calculations were also carried out for Inventive Resins 2-8 and for control Resins 12-14. Results are summarized in Table VIII:

TABLE VIII

| Resin | Block Sequence, phm | Bd:Styr. Wt. Ratio | $M_n$ Before Coupling |
|---|---|---|---|
| 1 | 37.0 3.0 8.0 1.5 3.6 2.8<br>$S_1-B_1-S_2-B_2-S_3-B_3$ | 13:87 | 143,000 |
|  | 8.0 1.5 3.6 2.8<br>$S_2-B_2-S_3-B_3$ | 27:73 | 41,000 |
|  | 15.8 12.4<br>$S_3-B_3$ | 44:56 | 16,000 |
| 2 | 40.0 3.0 6.7 1.6 3.6 2.8<br>$S_1-B_1-S_2-B_2-S_3-B_3$ | 14:86 | 137,000 |
|  | 6.3 1.4 3.3 2.6<br>$S_2-B_2-S_3-B_3$ | 29:71 | 35,000 |
|  | 16.1 12.6<br>$S_3-B_3$ | 44:56 | 15,000 |
| 3 | 40.0 3.0 6.7 1.6 3.1 3.0<br>$S_1-B_1-S_2-B_2-S_3-B_3$ | 13:87 | 136,000 |
|  | 6.3 1.4 2.9 2.7<br>$S_2-B_2-S_3-B_3$ | 31:69 | 34,000 |
|  | 15.0 14.3<br>$S_3-B_3$ | 49:51 | 13,000 |
| 4 | 37.0 3.0 16.0 3.0 4.0 3.2<br>$S_1-B_1-S_2-B_2-S_3-B_3$ | 14:86 | 132,000 |
|  | 19.0 14.8<br>$S_3-B_3$ | 44:56 | 14,000 |
| 5 | 37.0 3.0 16.0 3.0 4.5 4.3<br>$S_1-B_1-S_2-B_2-S_3-B_3$ | 15:85 | 123,000 |
|  | 16.5 15.7<br>$S_3-B_3$ | 49:51 | 16,000 |
| 6 | 37.0 3.0 16.0 3.0 3.7 3.5<br>$S_1-B_1-S_2-B_2-S_3-B_3$ | 14:86 | 138,000 |
|  | 17.3 16.5<br>$S_3-B_3$ | 49:51 | 15,000 |
| 7 | 37.0 8.0 3.0 4.3 3.4<br>$S_1-S_2-B_1-S_3-B_2$ | 11:89 | 119,000 |
|  | 8.0 3.0 4.3 3.4<br>$S_2-B_1-S_3-B_2$ | 34:66 | 40,000 |
|  | 14.4 11.2<br>$S_3-B_2$ | 44:56 | 16,000 |
| 8 | 37.0 8.0 3.0 3.8 3.3<br>$S_1-S_2-B_1-S_3-B_2$ | 11:89 | 117,000 |
|  | 8.0 3.0 3.8 3.3<br>$S_2-B_1-S_3-B_2$ | 35:65 | 39,000 |
|  | 14.0 12.4<br>$S_3-B_2$ | 46:54 | 15,000 |
| 12-14 | 37.0 16.0 4.8 4.9<br>$S_1-S_2-S_3-B$ | 8:92 | 101,000-120,000 |
|  | 18.2 19.0<br>$S_3-B$ | 51:49 | 18,000-20,000 |

The disclosure, including data, illustrate the value and effectiveness of my invention.

The resinous polymodal copolymer products of my invention are particularly useful as a blending component for general purpose polystyrene to improve greatly the scope of use of the polystyrene.

The Examples, the knowledge and background of the field of the invention, and the general principles of chemistry and of other applicable sciences, form the bases from which the broad descriptions of my invention including the ranges of conditions and the generic groups of operant components have been developed, and form the bases for my claims here appended.

I claim:

1. A sequential mode of block copolymerization comprising:
  polymerizing under solution polymerization conditions at least one monovinylarene monomer and at least one conjugated diene monomer in a ratio of about 55 to 95 weight percent monovinylarene and 45 to 5 weight percent conjugated diene, by a sequential charge polymerization process wherein at least two separate charges consisting of said conjugated diene, at least two separate charges consisting of said monovinylarene, and at least two charges of a monoalkali metal initiator are employed; at least one separate charge of each of said monovinylarene and of said conjugated diene follows the last charge of said monoalkali metal initiator; at least one separate charge of conjugated diene precedes the last charge of monoalkali metal initiator; each separate monomer charge homopolymerizes to substantial completion prior to addition of any subsequent charge; the total of the number of separate charges of each of said conjugated diene, of said monovinylarene, and of said monoalkali metal initiator, is not in excess of 3, and thereafter coupling with a polyfunctional coupling agent;

wherein said sequential charge polymerization process employs a charge order:

| Charge Order | |
|---|---|
| 1/2 | L/S |
| 3 | B |
| 4/5 | L/S |
| 6 | B |
| 7/8 | L/S |
| 9 | B |
| 10 | C | where
L=hydrocarbyl monoalkali metal initiator addition,
S=monovinylarene monomer addition,
B=conjugated diene addition, and
C=coupling agent addition;
thereby producing a polymodal, craze-resistant, low color, resinous coupled copolymer.

2. The resulting copolymer prepared by the process of claim 1.

3. Blends of polystyrene with the copolymer of claim 2.

4. Blister packs made of the copolymer of claim 2.

5. The process of claim 1 employing ranges of monomer additions and of monoalkali metal initiator additions at each increment:

| | | |
|---|---|---|
| | L-1 (mhm) | 0.3–0.55 |
| | S-1 (phm) | 30–45 |
| | B-1 (phm) | 0.6–9 |
| | L-2 (mhm) | 0.3–0.55 |
| | S-2 (phm) | 10–20 |
| | B-2 (phm) | 0.6–9 |
| | L-3 (mhm) | 1.1–2.8 |
| | S-3 (phm) | 15–30 |
| | B-3 (phm) | 3.8–2.7 |
| Totals | S (phm) | 55–95 |
| | B (phm) | 45–5 |
| | L (mhm) | 1.7–3.9. |

6. The process of claim 5 wherein the resultant copolymer contains relative block sizes before coupling calculated from ranges of additions:

| $S_1$—$B_1$—$S_2$—$B_2$—$S_3$—$B_3$: | | |
|---|---|---|
| | $S_1$ (phm) | 30–45 |
| | $B_1$ (phm) | 0.6–9 |
| | $S_2$ (phm) | 5–10 |
| | $B_2$ (phm) | 0.3–4.5 |
| | $S_3$ (phm) | 2.6–4.2 |
| | $B_3$ (phm) | 0.7–3.8 , |
| $S_2$—$B_2$—$S_3$—$B_3$: | | |
| | $S_2$ (phm) | 5–10 |
| | $B_2$ (phm) | 0.3–4.5 |
| | $S_3$ (phm) | 2.6–4.2 |
| | $B_3$ (phm) | 0.7–3.8 , and |
| $S_3$—$B_3$: | | |
| | $S_3$ (phm) | 9.7–21.6 |
| | $B_3$ (phm) | 2.4–19.4 ; and molecular weights |
| after coupling: | $M_n \times 10^{-3}$ | 80–300 and |
| | $M_n \times 10^{-3}$ | 50–200. |

7. The process of claim 1 employing ranges of monomer additions and of monoalkali metal additions at each increment:

| | | |
|---|---|---|
| | L-1 (mhm) | 0.34–0.47 |
| | S-1 (phm) | 35–41 |
| | B-1 (phm) | 2–4 |
| | L-2 (mhm) | 0.34–0.47 |
| | S-2 (phm) | 12–18 |
| | B-2 (phm) | 2–4 |
| | L-3 (mhm) | 1.56–2.34 |
| | S-3 (phm) | 18–26 |
| | B-3 (phm) | 16–23 |
| Totals | S (phm) | 70–80 |
| | B (phm) | 30–20 |
| | L (mhm) | 2.2–3.3. |

8. The process of claim 7 wherein the resultant copolymer contains relative block sizes before coupling calculated from narrow ranges of additions:

| $S_1$—$B_1$—$S_2$—$B_2$—$S_3$—$B_3$: | | |
|---|---|---|
| | $S_1$ (phm) | 35–41 |
| | $B_1$ (phm) | 2–4 |
| | $S_2$ (phm) | 6–9 |
| | $B_2$ (phm) | 1–2 |
| | $S_3$ (phm) | 2.7–3.7 |
| | $B_3$ (phm) | 2.4–3.3 , |
| $S_2$—$B_2$—$S_3$—$B_3$: | | |
| | $S_2$ (phm) | 6–9 |
| | $B_2$ (phm) | 1–2 |
| | $S_3$ (phm) | 2.7–3.7 |
| | $B_3$ (phm) | 2.4–3.3 and |
| $S_3$—$B_3$: | | |
| | $S_3$ (phm) | 12.5–18.5 |
| | $B_3$ (phm) | 11.1–16.4 ; and molecular weights |
| after coupling: | $M_w \times 10^{-3}$ | 150–200 and |

-continued

| | |
|---|---|
| $M_n \times 10^{-3}$ | 90–120. |

9. The process of claim 8 wherein said conjugated diene monomer contains 4 to 6 carbon atoms per molecule; said monovinylarene monomer contains 8 to 10 carbon atoms per monomer; and employing a hydrocarbyl monolithium initiator as said monoalkali metal initiator.

10. The process of claim 9 employing butadiene or isoprene as said conjugated diene, and styrene as said monovinylarene.

11. The process of claim 10 employing butadiene as said conjugated diene, butyllithium as said initiator, and an epoxidized compound as said coupling agent.

12. The resulting copolymer of claim 11.

13. Blends of polystyrene and the copolymer of claim 12.

14. Blister packs comprising the copolymer of claim 12.

15. A sequential mode of block copolymerization comprising:
polymerizing under solution polymerization conditions at least one monovinylarene monomer and at least one conjugated diene monomer in a ratio of about 55 to 95 weight percent monovinylarene and 45 to 5 weight percent conjugated diene, by a sequential charge polymerization process wherein at least two separate charges consisting of said conjugated diene, two separate charges consisting of said monovinylarene, and at least two charges of a monoalkali metal initiator are employed; at least one separate charge of each of said monovinylarene and of said conjugated diene follows the last charge of said monoalkali metal initiator; at least one separate charge of conjugated diene precedes the last charge of monoalkali metal initiator; each separate monomer charge homopolymerizes to substantial completion prior to addition of any subsequent charge; the total number of separate charges of each of said conjugated diene, said monovinylarene, and charges of said monoalkali metal initiators, is not in excess of 3, and thereafter coupling with a polyfunctional coupling agent; wherein said sequential charge polymerization process employs a charge order:

| Charge Order | |
|---|---|
| 1/2 | L/S |
| 3 | B |
| 4 | S |
| 5 | B |
| 6/7 | L/S |
| 8 | B |
| 9 | C | where
L = monoalkali metal initiator,
S = monovinylarene monomer,
B = conjugated diene monomer, and
C = coupling agent;
thereby producing a polymodal, craze-resistant, low color, resinous coupled copolymer.

16. The process of claim 15 employing ranges of monomer additions and of monoalkali metal added at each increment:

| | | |
|---|---|---|
| | L-1 (mhm) | 0.39–0.78 |
| | S-1 (phm) | 30–45 |
| | B-1 (phm) | 0.6–9 |
| | S-2 (phm) | 10–20 |
| | B-2 (phm) | 0.6–9 |
| | L-2 (mhm) | 1.56–3.9 |
| | S-3 (phm) | 15–30 |
| | B-3 (phm) | 3.8–27 |
| Totals | S (phm) | 55–95 |
| | B (phm) | 45–5 |
| | L (mhm) | 2–4.7. |

17. The process of claim 16 wherein the resultant block copolymer contains calculated relative block sizes before coupling:

| | | |
|---|---|---|
| $S_1$—$B_1$—$S_2$—$B_2$—$S_3$—$B_3$: | | |
| | $S_1$ (phm) | 30–45 |
| | $B_1$ (phm) | 0.6–9 |
| | $S_2$ (phm) | 10–20 |
| | $B_2$ (phm) | 0.6–9 |
| | $S_3$ (phm) | 3–5 |
| | $B_3$ (phm) | 0.8–4.5 , and |
| $S_3$—$B_3$: | | |
| | $S_3$ (phm) | 12–25 |
| | $B_3$ (phm) | 3–22.5 ; and molecular weights |
| after coupling: | $M_w \times 10^{-3}$ | 80–300 and |
| | $M_n \times 10^{-3}$ | 50–200. |

18. The process of claim 15 employing ranges of monomer additions and of monoalkali metal initiator added at each increment:

| | | |
|---|---|---|
| | L-1 (mhm) | 0.47–0.63 |
| | S-1 (phm) | 35–40 |
| | B-1 (phm) | 2–4 |
| | S-1 (phm) | 13–18 |
| | B-2 (phm) | 2–4 |
| | L-2 (mhm) | 1.88–2.66 |
| | S-3 (phm) | 18–25 |
| | B-3 (phm) | 15–23 |
| Totals | S (phm) | 70–80 |
| | B (phm) | 30–20 |
| | L (mhm) | 2.3–3.4. |

19. The process of claim 18 wherein the resultant copolymer contains calculated relative block sizes before coupling:

| $S_1-B_1-S_2-B_2-S_3-B_3$: | | |
|---|---|---|
| $S_1$ (phm) | 35–40 | |
| $B_1$ (phm) | 2–4 | |
| $S_2$ (phm) | 13–18 | |
| $B_2$ (phm) | 2–4 | |
| $S_3$ (phm) | 3.6–4.8 | |
| $B_3$ (phm) | 3–4.4, | and |
| $S_3-B_3$: | | |
| $S_3$ (phm) | 14.4–20.2 | |
| $B_3$ (phm) | 12–18.6; | and molecular weights |
| after coupling: | | |
| $M_w \times 10^{-3}$ | 140–220, | and |
| $M_n \times 10^{-3}$ | 90–120. | |

20. The process of claim 19 wherein said conjugated diene monomer contains 4 to 6 carbon atoms per molecule; said monovinylarene monomer contains 8 to 10 carbon atoms per monomer; and employing a hydrocarbyl monolithium initiator as said monoalkali metal initiator.

21. The process of claim 20 employing butadiene or isoprene as said conjugated diene, and styrene as said monovinylarene.

22. The process of claim 21 employing butadiene as said conjugated diene, and an epoxidized compound as said coupling agent.

23. The resulting copolymer of claim 22.

24. Blends of polystyrene with the copolymer of claim 23.

25. Blister packs comprising the copolymer of claim 23.

26. The resulting copolymer prepared by the process of claim 15.

27. Blends of polystyrene with the copolymer of claim 26.

28. Blister packs made of the copolymer of claim 26.

29. A sequential mode of block copolymerization comprising:
polymerizing under solution polymerization conditions at least one monovinylarene monomer and at least one conjugated diene monomer in a ratio of about 55 to 95 weight percent monovinylarene and 45 to 5 weight percent conjugated diene, by a sequential charge polymerization process wherein at least two separate charges consisting of said conjugated diene, at least two separate charges consisting of said monovinylarene, and at least two charges of a monoalkali metal initiator are employed; at least one separate charge of each of said monovinylarene and of said conjugated diene follows the last charge of said monoalkali metal initiator; at least one separate charge of conjugated diene precedes the large charge of monoalkali metal initiator; each separate monomer charge homopolymerizes to substantial completion prior to addition of any subsequent charge; the total of the number of separate charges of each of said conjugated diene, of said monovinylarene, and of said monoalkali metal initiator, is not in excess of 3, and thereafter coupling with a polyfunctional coupling agent;
wherein said sequential charge polymerization process employs a charge order;

| Charge Order | |
|---|---|
| 1/2 | L/S |
| 3/4 | L/S |
| 5 | B |
| 6/7 | L/S |
| 8 | B |
| 9 | C | where
L = monoalkali metal initiator,
S = monovinylarene monomer,
B = conjugated diene monomer, and
C = coupling agent;
thereby producing a polymodal, craze-resistant, low color, resinous coupled copolymer.

30. The process of claim 29 employing ranges of monomer additions and of monoalkali metal initiator added at each increment:

| | | |
|---|---|---|
| | L-1 (mhm) | 0.3–0.63 |
| | S-1 (phm) | 30–45 |
| | L-2 (mhm) | 0.3–0.63 |
| | S-2 (phm) | 10–20 |
| | B-1 (phm) | 1.2–18 |
| | L-3 (mhm) | 0.94–2.8 |
| | S-3 (phm) | 15–30 |
| | B-3 (phm) | 3.8–27 |
| Totals | S (phm) | 55–95 |
| | B (phm) | 45–5 |
| | L (mhm) | 1.5–4. |

31. The process of claim 30 wherein the resultant block copolymer contains calculated relative block sizes before coupling:

| $S_1-S_2-B_1-S_3-B_2$: | | |
|---|---|---|
| $S_1$ (phm) | 30–45 | |
| $S_2$ (phm) | 5–10 | |
| $B_1$ (phm) | 0.6–9 | |
| $S_3$ (phm) | 3–4.6 | |
| $B_2$ (phm) | 0.7–4.2, | |
| $S_2-B_1-S_3-B_2$: | | |
| $S_2$ (phm) | 5–10 | |
| $B_1$ (phm) | 0.6–9 | |
| $S_3$ (phm) | 3–4.6 | |
| $B_2$ (phm) | 0.7–4.2, | and |
| $S_3-B_2$: | | |
| $S_3$ (phm) | 9–20.7 | |
| $B_2$ (phm) | 2.4–18.6; | and molecular weight |
| after coupling: | | |
| $M_w \times 10^{-3}$ | 80–300 | and |
| $M_n \times 10^{-3}$ | 50–200. | |

32. The process of claim 29 employing ranges of monomer additions and of monoalkali metal initiator added at each increment:

| | | |
|---|---|---|
| | L-1 (mhm) | 0.38–0.55 |
| | S-1 (phm) | 35–40 |
| | L-2 (mhm) | 0.38–0.55 |
| | S-2 (phm) | 12–18 |
| | B-1 (phm) | 4–8 |
| | L-3 (mhm) | 1.25–2.19 |
| | S-3 (phm) | 20–25 |
| | B-3 (phm) | 15–22 |
| Totals | S (phm) | 70–80 |
| | B (phm) | 30–20 |

| | L (mhm) | 2–3.3. |
|---|---|---|

33. The process of claim 32 wherein the resultant block copolymer contains calculated block sizes before coupling:

| $S_1$—$S_2$—$B_1$—$S_3$—$B_2$: | | |
|---|---|---|
| $S_1$ (phm) | 35–40 | |
| $S_2$ (phm) | 6–9 | |
| $B_1$ (phm) | 2–4 | |
| $S_3$ (phm) | 3.8–4.2 | |
| $B_2$ (phm) | 2.8–3.7, | |
| $S_2$—$B_1$—$S_3$—$B_3$: | | |
| $S_2$ (phm) | 6–9 | |
| $B_1$ (phm) | 2–4 | |
| $S_3$ (phm) | 3.8–4.2 | |
| $B_2$ (phm) | 2.8–3.7, | and |
| $S_3$—$B_2$: | | |
| $S_3$ (phm) | 12.4–16.6 | |
| $B_2$ (phm) | 9.3–14.6, | and molecular weights |
| after coupling: | | |
| $M_w \times 10^{-3}$ | 150–200 | and |
| $M_n \times 10^{-3}$ | 90–120. | |

34. The process of claim 33 wherein said conjugated diene monomer contains 4 to 6 carbon atoms per molecule; said monovinylarene monomer contains 8 to 10 carbon atoms per monomer; and employing a hydrocarbyl monolithium initiator as said monoalkali metal initiator.

35. The process of claim 34 employing butadiene or isoprene as said conjugated diene, and styrene as said monovinylarene.

36. The process of claim 35 employing butadiene as said conjugated diene, and an epoxidized compound as said coupling agent.

37. The resulting copolymer of claim 36.

38. Blends of polystyrene with the copolymer of claim 37.

39. Blister packs comprising the copolymer of claim 37.

40. The resulting copolymer prepared by the process of claim 29.

41. Blends of polystyrene with the copolymer of claim 40.

42. Blister packs made of the copolymer of claim 40.

43. A resinous polymodal coupled block copolymer of at least one conjugated diene monomer of 4 to 6 carbon atoms per molecule and at least one monovinylarene monomer of 8 to 10 carbon atoms per molecule, in a weight ratio of 40 to 13 percent copolymerized conjugated diene and 60 to 87 percent copolymerized monovinylarene, wherein said copolymer contains relative block sizes before coupling:

| $S_1$—$B_1$—$S_2$—$B_2$—$S_3$—$B_3$: | | |
|---|---|---|
| $S_1$ (phm) | 30–45 | |
| $B_1$ (phm) | 0.6–9 | |
| $S_2$ (phm) | 5–10 | |
| $B_2$ (phm) | 0.3–4.5 | |
| $S_3$ (phm) | 2.6–4.2 | |
| $B_3$ (phm) | 0.7–3.8, | |
| $S_2$—$B_2$—$S_3$—$B_3$: | | |
| $S_2$ (phm) | 5–10 | |
| $B_2$ (phm) | 0.3–4.5 | |
| $S_3$ (phm) | 2.6–4.2 | |
| $B_3$ (phm) | 0.7–3.8, | and |
| $S_3$—$B_3$: | | |
| $S_3$ (phm) | 9.7–21.6 | |
| $B_3$ (phm) | 2.4–19.4; | and molecular weights |
| after coupling: | | |
| $M_w \times 10^{-3}$ | 80–300 | and |
| $M_n \times 10^{-3}$ | 50–200; | | and exhibiting low haze, low color, and high craze resistance in sheet form.

44. The copolymer of claim 43 containing relative block sizes before coupling:

| $S_1$—$B_1$—$S_2$—$B_2$—$S_3$—$B_3$: | | |
|---|---|---|
| $S_1$ (phm) | 35–41 | |
| $B_1$ (phm) | 2–4 | |
| $S_2$ (phm) | 6–9 | |
| $B_2$ (phm) | 1–2 | |
| $S_3$ (phm) | 2.7–3.7 | |
| $B_3$ (phm) | 2.4–3.3, | |
| $S_2$—$B_2$—$S_3$—$B_3$: | | |
| $S_2$ (phm) | 6–9 | |
| $B_2$ (phm) | 1–2 | |
| $S_3$ (phm) | 2.7–3.7 | |
| $B_3$ (phm) | 2.4–3.3 | and |
| $S_3$—$B_3$: | | |
| $S_3$ (phm) | 12.5–18.5 | |
| $B_3$ (phm) | 11.1–16.4; | and molecular weights |
| after coupling: | | |
| $M_w \times 10^{-3}$ | 150–200 | and |
| $M_n \times 10^{-3}$ | 90–120. | |

45. The copolymer of claim 44 wherein said conjugated diene monomer contains 4 to 6 carbon atoms per molecule; and said monovinylarene monomer contains 8 to 10 carbon atoms per monomer.

46. The copolymer of claim 45 wherein butadiene or isoprene is said conjugated diene, and styrene is said monovinylarene.

47. The copolymer of claim 46 wherein butadiene is said conjugated diene, and an epoxidized compound was employed to effect coupling.

48. Blends of the copolymer of claim 47 with polystyrene.

49. Blister packs comprising the copolymer of claim 47.

50. A resinous polymodal coupled block copolymer of at least one conjugated diene monomer of 4 to 6 carbon atoms per molecule and at least one monovinylarene monomer of 8 to 10 carbon atoms per molecule, in a weight ratio of 40 to 13 percent copolymerized conjugated diene and 60 to 87 percent copolymerized monovinylarene, wherein said block copolymer contains relative block sizes before coupling:

| $S_1$—$B_1$—$S_2$—$B_2$—$S_3$—$B_3$: | | |
|---|---|---|
| $S_1$ (phm) | 30–45 | |
| $B_1$ (phm) | 0.6–9 | |
| $S_2$ (phm) | 10–20 | |
| $B_2$ (phm) | 0.6–9 | |
| $S_3$ (phm) | 3–5 | |
| $B_3$ (phm) | 0.8–4.5, | and |
| $S_3$—$B_3$ | | |
| $S_2$ (phm) | 12–25 | |
| $B_3$ (phm) | 3–22.5; | and molecular weights |
| after coupling: | | |
| $M_w \times 10^{-3}$ | 80–300 | and |

| -continued | |
|---|---|
| $M_n \times 10^{-3}$ | 50–200, | and exhibiting low haze, low color, and high craze resistance in sheet form.

51. The copolymer of claim 50 wherein the copolymer containing relative block sizes before coupling:

| $S_1-B_1-S_2-B_2-S_3-B_3$: | | |
|---|---|---|
| $S_1$ (phm) | 35–40 | |
| $B_1$ (phm) | 2–4 | |
| $S_2$ (phm) | 13–18 | |
| $B_2$ (phm) | 2–4 | |
| $S_3$ (phm) | 3.6–4.8 | |
| $B_3$ (phm) | 3–4.4, | and |
| $S_3-B_3$: | | |
| $S_3$ (phm) | 14.4–20.2 | |
| $B_3$ (phm) | 12–18.6; | and molecular weights |
| after coupling: | | |
| $M_w \times 10^{-3}$ | 140–220, | and |
| $M_n \times 10^{-3}$ | 90–120. | |

52. The copolymer of claim 51 wherein said conjugated diene monomer contains 4 to 6 carbon atoms per molecule; and said monovinylarene monomer contains 8 to 10 carbon atoms per monomer.

53. The copolymer of claim 52 wherein butadiene or isoprene is said conjugated diene, and styrene is said monovinylarene.

54. The copolymer of claim 53 wherein said butadiene is said conjugated diene, and an epoxidized compound was employed to effect coupling.

55. Blends of polystyrene with the copolymer of claim 54.

56. Blister packs comprising the copolymer of claim 54.

57. A resinous polymodal coupled block copolymer of at least one conjugated diene monomer of 4 to 6 carbon atoms per molecule and at least one monovinylarene monomer of 8 to 10 carbon atoms per molecule, in a weight ratio of 40 to 13 percent copolymerized conjugated diene and 60 to 87 percent copolymerized monovinylarene, wherein said block copolymer contains relative block sizes before coupling:

| $S_1-S_2-B_1-S_3-B_2$: | |
|---|---|
| $S_1$ (phm) | 30–45 |
| $S_2$ (phm) | 5–10 |
| $B_1$ (phm) | 0.6–9 |
| $S_3$ (phm) | 3–4.6 |
| $B_2$ (phm) | 0.7–4.2, |
| $S_2-B_1-S_3-B_2$: | |
| $S_2$ (phm) | 5–10 |
| $B_1$ (phm) | 0.6–9 |
| $S_3$ (phm) | 3–4.6 |
| $B_2$ (phm) | 0.7–4.2, and |
| $S_3-B_2$: | |
| $S_3$ (phm) | 9–20.7 |
| $B_2$ (phm) | 2.4–18.6; and molecular weights |
| after coupling: | |
| $M_w \times 10^{-3}$ | 80–300 and |
| $m_n \times 10^{-3}$ | 50–200; | and exhibiting low haze, low color, and high craze resistance in sheet form.

58. The copolymer of claim 57 wherein said block copolymer contains block sizes before coupling:

| $S_1-S_2-B_1-S_3-B_2$: | | |
|---|---|---|
| $S_1$ (phm) | 35–40 | |
| $S_2$ (phm) | 6–9 | |
| $B_1$ (phm) | 2–4 | |
| $S_3$ (phm) | 3.8–4.2 | |
| $B_2$ (phm) | 2.8–3.7, | |
| $S_2-B_1-S_3-B_3$: | | |
| $S_2$ (phm) | 6–9 | |
| $B_1$ (phm) | 2–4 | |
| $S_3$ (phm) | 3.8–4.2 | |
| $B_2$ (phm) | 2.8–3.7, | and |
| $S_3-B_2$: | | |
| $S_3$ (phm) | 12.4–16.6 | |
| $B_2$ (phm) | 9.3–14.6; | and molecular weights |
| after coupling: | | |
| $M_w \times 10^{-3}$ | 150–200 | and |
| $M_n \times 10^{-3}$ | 90–120. | |

59. The copolymer of claim 58 wherein said conjugated diene monomer contains 4 to 6 carbon atoms per molecule; and said monovinylarene monomer contains 8 to 10 carbon atoms per monomer.

60. The copolymer of claim 59 wherein said butadiene or isoprene is said conjugated diene, and styrene is said monovinylarene.

61. The copolymer of claim 60 wherein butadiene is said conjugated diene, and an epoxidized compound effected coupling.

62. Blends of polystyrene with the copolymer of claim 61.

63. Blister packs comprising the copolymer of claim 61.

* * * * *